United States Patent
Liao et al.

(10) Patent No.: US 11,288,991 B1
(45) Date of Patent: Mar. 29, 2022

(54) CLOSED LOOP CONTROLLER FOR LASER BEAM SCANNING DISPLAY WITH HIGH TOLERANCE TO MIRROR RESONANCE FREQUENCY VARIATION

(71) Applicant: MICROSOFT TECHNOLOGY LICENSING, LLC, Redmond, WA (US)

(72) Inventors: Wenjun Liao, Mountain View, CA (US); Seyed Ahmad Mortazavi, Sunnyvale, CA (US); Chuan Pu, Foster City, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/361,281

(22) Filed: Jun. 28, 2021

(51) Int. Cl.
*G06F 1/00* (2006.01)
*G09G 3/02* (2006.01)
*G02B 26/10* (2006.01)

(52) U.S. Cl.
CPC .......... *G09G 3/025* (2013.01); *G02B 26/105* (2013.01); *G09G 2310/0243* (2013.01); *G09G 2310/06* (2013.01); *G09G 2320/02* (2013.01); *G09G 2330/08* (2013.01); *G09G 2330/12* (2013.01); *G09G 2360/18* (2013.01)

(58) Field of Classification Search
None
See application file for complete search history.

(56) References Cited

U.S. PATENT DOCUMENTS 8,059,322 B1* 11/2011 Brown ............... G02B 26/0833
359/199.1
2014/0168738 A1* 6/2014 Ko ..................... G02B 26/0833
359/214.1

* cited by examiner

*Primary Examiner* — Michael A Faragalla
(74) *Attorney, Agent, or Firm* — Scott Y. Shigeta; Newport IP, LLC

(57) ABSTRACT

The techniques disclosed herein provide methods, devices, and systems to compensate the drive waveform to a slow-scan mirror in a laser beam scanning (LBS) display device. The slow-scan controller generates the drive waveform, which is combined with feedback and coupled to the input of a notch filter in the control loop. Ripple in the slow-scan mirror trajectory, which occurs as a consequence of mismatches between the notch frequency of the notch filter and the resonance of the slow-scan mirror, is effectively suppressed in real time by an adaptive notch compensator. Consequently, the described compensation scheme allows for relaxed notch filter design criteria with high tolerance and mitigation of ripple is achieved at reduced cost. The parameters, logic and blocks of the adaptive notch compensator scheme may be time-domain or frequency domain solutions that are implemented, in hardware, software or combinations thereof.

20 Claims, 15 Drawing Sheets

CLOSED LOOP CONTROLLER FOR LASER BEAM SCANNING DISPLAY WITH HIGH TOLERANCE TO MIRROR RESONANCE FREQUENCY VARIATION

BACKGROUND

Laser beam scanning ("LBS") display devices form displayed images by using mirrors, such as microelectromechanical systems ("MEMS") mirrors, to direct a laser beam onto a display region. In such display devices, the mirrors may move over the course of a frame to control the location in the display region toward which the laser beam is directed. Some LBS displays use two mirrors, a fast-scan mirror that scans under resonance and a slow-scan mirror that scans linearly. Mirrors used by LBS display devices are susceptible to noise and disturbance forces (e.g., electrical, mechanical, etc.).

The disclosure made herein is presented with respect to these and other technical challenges.

SUMMARY

The techniques disclosed herein provide methods, devices, and systems to compensate the drive waveform to a slow-scan mirror in a laser beam scanning (LBS) display device. The slow-scan controller generates the drive waveform, which is combined with feedback and coupled to the input of a notch filter in the control loop. Ripple in the slow-scan mirror trajectory, which occurs as a consequence of mismatches between the notch frequency of the notch filter and the resonance of the slow-scan mirror, is effectively suppressed in real time by an adaptive notch compensator. Consequently, the described compensation scheme allows for relaxed notch filter design criteria with high tolerance and mitigation of ripple is achieved at reduced cost. The parameters, logic and blocks of the adaptive notch compensator scheme may be time-domain or frequency domain solutions that are implemented, in hardware, software or combinations thereof.

The described embodiments may be implemented as hardware, software, or a combination of hardware and software. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
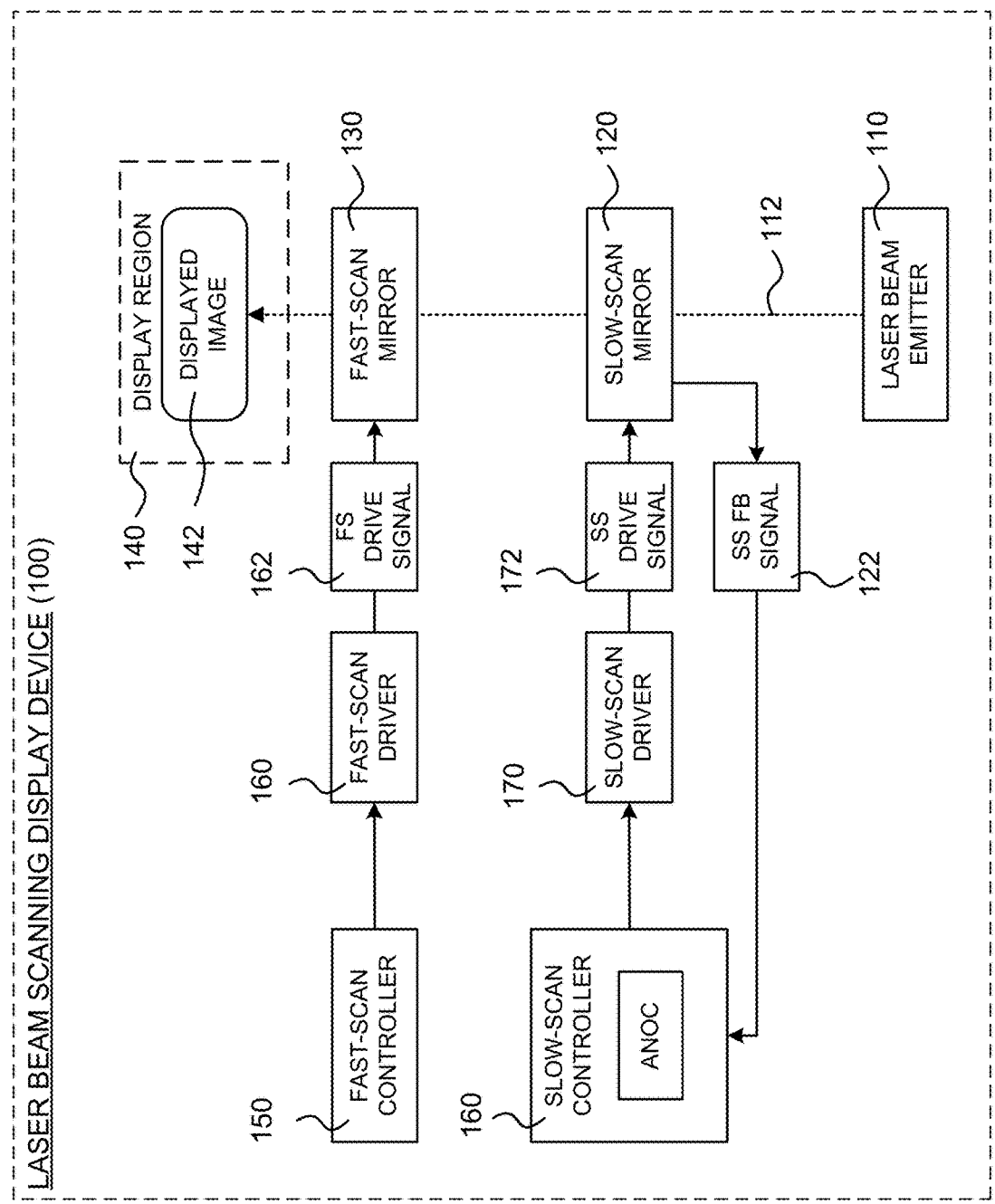
FIG. 1 shows an illustrative laser beam scanning display system.

The following detailed description is directed to technologies for improving display image quality in a laser beam scanning ("LBS") display device. An example LBS display device may have a laser beam emitter, a slow-scan (SS) controller and driver, a fast-scan (FS) controller and driver, a slow-scan (SS) mirror, and a fast-scan (FS) mirror. The laser beam emitter is configured to emit a laser beam to the FS and SS mirrors, which may be implemented as microelectromechanical systems ("MEMS") mirrors. The FS mirror, under control of the FS controller, scans across one axis of the display under resonance (e.g., vertical scanning of the display). The SS mirror, under control of the SS controller, scans linearly across another axis of the display (e.g., horizontal scanning of the display).

The slow-scan (SS) mirror in a LBS display device may be implemented as a mechanical device (e.g., MEMS), which requires suppression of undesired SS resonance modes, and especially the strongest first mode or fundamental frequency ($f_0$). A notch filter may be included in the control loop, which is specifically selected to suppress the undesired SS resonance modes.

The design of the notch filter for suppression of SS resonance modes requires a filter design that closely matches the SS mirror resonance in the frequency domain. However, the SS mirror and other system components may vary in performance due to manufacturing variations, temperature and humidity variations, and external vibrations. These variations in performance, may cause a significant shift in the resonance modes of the SS mirror relative to the notch filter's design frequency and stop band (e.g., 3 dB bandwidth). A mismatch between the notch filter frequency, Q, or height, and the SS mirror may be exhibited as a significant and undesirable ripple in the SS mirror trajectory, resulting in poor image quality and distortion in the resulting LBS display device.

Through implementations of the disclosed technologies, an LBS architecture may be implemented to suppress undesired SS resonance modes, improve disturbance rejection, improve noise suppression, and compensate for manufacturing variations as well as changes in environmental conditions such as temperature and humidity that may cause mismatches in the MEMS based mirror and the notch filter. Other technical benefits not specifically mentioned herein can also be realized through implementations of the disclosed subject matter.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for protecting mirrors in an LBS display device will be described.

FIG. 1 shows an illustrative laser beam scanning (LBS) display device 100. As illustrated, the LBS display device 100 includes a Laser Beam Emitter 110 that generates an Emitted Laser Beam 112 that is deflected by a FAST-SCAN (FS) Mirror 130 and a SLOW-SCAN (SS) Mirror 120. Beam deflection along a first axis (e.g., vertical axis) is provided by the FS Mirror 130 in response to a FS Drive Signal 162, which is provided by a FS Controller 150 via a FS Driver 160. Beam deflection along a second axis (e.g., horizontal axis) is provided by the SS Mirror 120 in response to a SS Drive Signal 172, which is provided by a SS Controller 160 via a SS Driver 170.

The SS Mirror 120 and the FS Mirror 130 may be configured to direct (e.g., reflect, deflect, steer, etc.) the Emitted Laser Beam 112 onto the Display Region 140 in response to their respective drive signals (162, 172). The resulting displayed image 142 may correspond to one or more frames in which the SS Mirror 120 and the FS Mirror 130 effectively "draw" the Displayed Image 142.

In some embodiments, the SS Mirror 120 is configured to complete a slow-scan period during each frame. The slow-scan period may include a display interval, where the SS Mirror 120 may linearly scan across the Display Region 140 from an initial scanning position to a final scanning position. The Laser Beam Emitter 110 may be configured to emit the Laser Beam 112 during the display interval. In the display interval, the FS Mirror 130 may perform multiple scans across the display region 140 to "draw" the Displayed Image 142.

The slow-scan period may further include a non-display interval. During the non-display interval, the SS Mirror 120 may be configured to return from the final scanning position to the initial scanning position. This portion of the non-display interval may also be referred to as "the flyback."

During the non-display interval, the Laser Beam Emitter 110 may be configured to not emit the Laser Beam 112. In some embodiments, the Display Region 140 may include one or more blank regions in which the Displayed Image 142 is not displayed. In addition to the flyback, the non-display interval may include time during which the SS Mirror 120 is oriented toward the one or more blank regions. The initial scanning position and the final scanning position may be located in the one or more blank regions.

As previously stated, SS Mirror 120 in the LBS display device may be implemented as a mechanical device (e.g., MEMS), which requires suppression of undesired SS resonance modes. A notch filter (not shown) may be included in the control loop (e.g., in the path of SS Driver 170), which is specifically selected to suppress the undesired SS resonance modes. The SS Mirror 120 generates a feedback signal, SS FB Signal 122, which is fed back to the SS controller 160. The SS controller 160 includes, among other things, an Adaptive Notch Compensator (ANOC) that is responsive to the SS FB Signal 122.

The waveform of the SS Drive Signal 172 will typically be a triangle shaped waveform such as a linear ramp or a sawtooth that drives the display (sometimes called a display ramp). As will be further described later, the linear ramp before and after the SS Mirror 120 can be evaluated to determine if an adjustment in gain is required or to compensate for any stability or ripple related issues that may occur in the system.

The adaptive notch compensator (ANOC) in SS Controller 160 improves disturbance rejection, improve noise suppression, and compensates for manufacturing variations as well as changes in environmental conditions such as temperature and humidity that may cause mismatches between the resonance modes of the MEMS based mirror and the notch frequency of the notch filter. Other technical benefits not specifically mentioned herein can also be realized through implementations of the disclosed subject matter.

Figure 2:
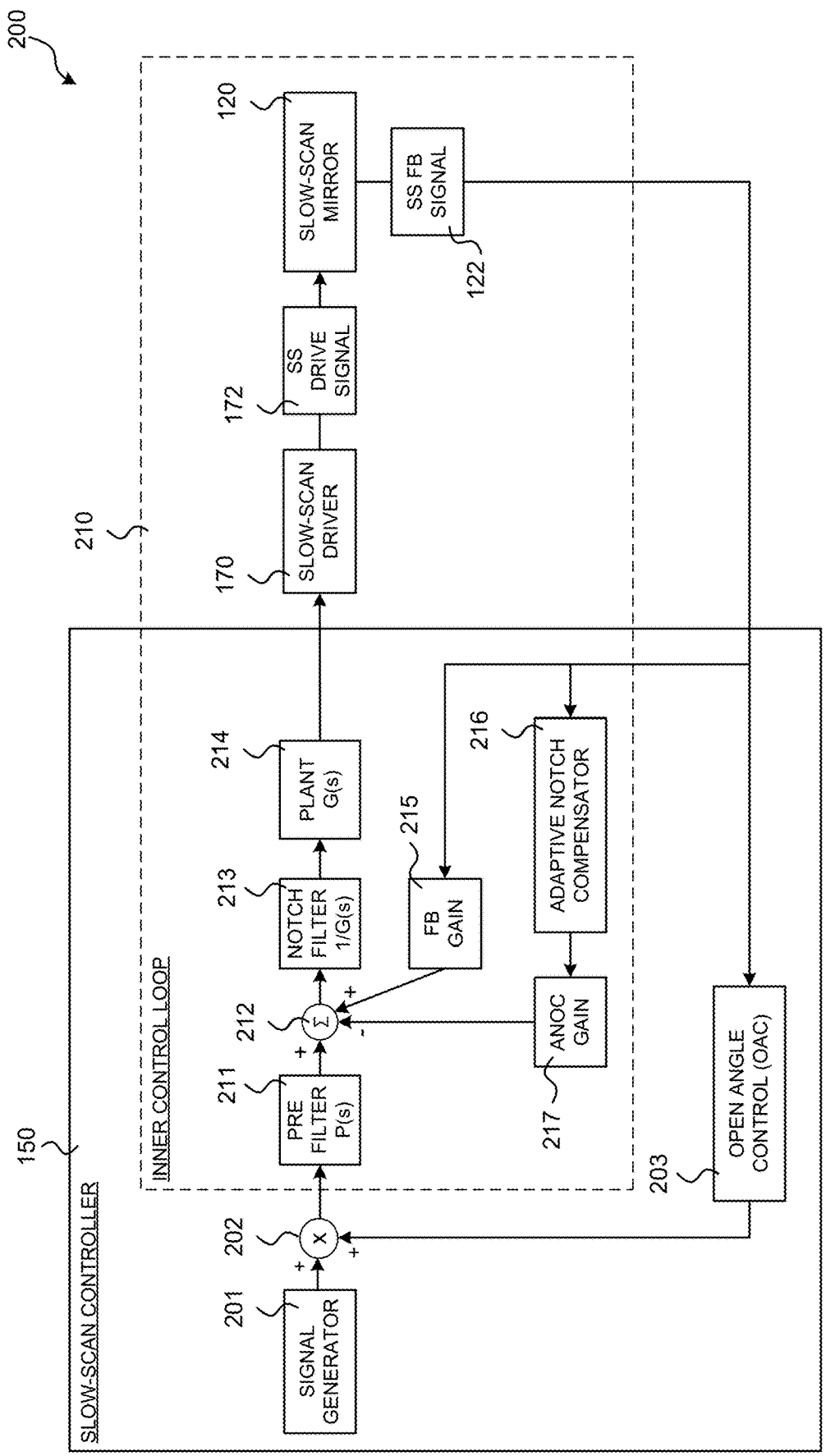
FIG. 2 shows a slow-scan controller for a laser beam scanning display device with a compensation control loop that includes an adaptive notch compensator.

FIG. 2 shows a slow-scan (SS) controller for a laser beam scanning display device 200 with an inner control loop that includes an adaptive notch compensator. LBS device 200 includes similar functional components to those illustrated FIG. 1, including SS Controller 160, SS Driver 170, and SS Mirror 120. The example SS Controller 150 further includes blocks for a Signal Generator 201, a Multiplier 202, a Pre-Filter 211, a Summer 212, a Notch Filter 213, a Plant 214, a Feedback (FB) Gain 215, an Adaptive Notch Compensator (ANOC) 216, an ANOC Gain 217, and an Open Angle Control (OAC) block 203.

The output of Signal Generator 201 is coupled to a first input (labeled as +) of Multiplier 202, while the output of OAC 203 is coupled to a second input (labeled as +) of Multiplier 202. The output of Multiplier 202 is coupled to the input of Pre-Filter 211. The output of Pre-Filter 211 is coupled to a first input (labeled as +) of Summer 212, while the output of ANOC Gain 217 is coupled to a second input (labeled as −) of Summer 212, and the output of FB Gain 215 is coupled to a third input (labeled as +) of Summer 212. The output of Summer 212 is coupled to an input of Notch Filter 213. The output of Notch Filter 213 is coupled to an input of Plant 214. The output of Plant 214 is coupled to an input of SS driver 216. The output of SS Driver 170, which corresponds to SS Drive Signal 172, is coupled to an input of SS Mirror 120. An output of SS Mirror 120, which corresponds to SS FB Signal 122, is coupled to an input of FB Gain 215, an input of ANOC 216, and an input of OAC 203. An output of ANOC 216 is coupled to an input of ANOC Gain 217.

The SS Controller 160 generates the SS Drive Signal 172 for the SS Mirror 120. The waveform that forms the overall shape of the SS Drive Signal 172, is generated by signal generator 201, via the operation of the multiplier 202, and Summer 212, and the various components of the outer and inner control loops. As previously stated, the SS Drive Signal 172 generally has a waveform shape that will typically be a triangle shaped waveform such as a linear ramp or a sawtooth that drives the display (sometimes called a display ramp).

The outer control loop includes Signal Generator 201, Multiplier 202, OAC 203, as well as portions of the inner control loop, SS Driver 170 and SS Mirror 120. The outer control loop is configured to combine, via Multiplier 202, the output of the Signal Generator 201 with the output of OAC 203. The output of Multiplier 202 is coupled to the input of SS Driver 170 through the Pre-Filter 211 and the inner control loop.

The inner control loop 210, which is designated by the dashed line in FIG. 2, includes Pre-Filter 211, Summer 212, Notch Filter 213, Plant 214, FB Gain 215, ANOC 216, ANOC Gain 217, as well as SS Driver 170 and SS Mirror 120. The inner control loop is configured to combine, via Summer 212, the output of the Pre-Filter 211 and the feedback from the SS Mirror 120, which corresponds to the outputs of FB Gain 215 and ANOC Gain 217. The output of Summer 212 is coupled to the input of Notch Filter 213, which suppresses certain frequencies that are expected to correspond to the undesirable resonance modes of the SS Mirror 120.

The operation of the inner control loop 176 will not influence the outer control loop with the OAC block 203 and the open angle control. The operation of the inner control loop 176 will be described in more detail below.

The inner control loop 176 is a critical part of the SS controller which is used for trajectory control, disturbance rejection and noise suppression. The Pre-Filter 211 with a transfer function given as P(s), while Notch Filter 213 has a transfer function given as 1/G(s), the Plant 214 has a transfer function of G(s). and ANOC 216 has a transfer function of H(s). The loop gain (LG) of the inner control loop 176 is determined, in part, as a product: LG=(MEMS Gain)*(Driver Gain)*(Feedback Sensor Gain)*(Digital Filter Gain). The SS Mirror Gain includes the gain of the drive and sense circuits. This inner control loop 210 loop gain should be kept as close to constant as possible to maintain the optimum controller performance. For example, if the loop gain is higher or lower than the desired value, the SS control loop is more vulnerable to external disturbances and we may also observe more jitter or uneven scan line density in the display images.

In some examples, the various blocks of SS Controller 160 may be implemented as digital signal processor (DSP) components, which may be implemented in silicon, so the gains of these block are quite stable and have little variation once they are set. The implementation can be done in many ways, including software methodologies (e.g., digital Si logic, FPGA, firmware, etc.), hardware-based solutions (PCB board with discrete components), or a combination of hardware/software.

The SS Mirror 120 and the related drive and sense circuits may be analog devices, or combinations of analog and digital devices. The gains of these blocks may be different from device to device (e.g., from manufacturing variations), and may also change as they age in operation over time, and may also change based on the operating environment (e.g., temperature, humidity, vibration, etc.).

For some examples, the various blocks of the filters (e.g., P(s), H(s)) can be implemented as analog filters, where the poles and zeros may correspond to passive components such as resistors, capacitors, inductors, etc.

In still further examples, the notch filter may be implemented by one or more DSP chips or embedded CPUS, etc.

In some examples, the SS Drive Signal 172 may be a digital signal (e.g., binary information, data, etc.) that is provided to the drive circuit in the SS Mirror 120, which then converts the digital signal into an analog signal (e.g., a voltage or current that drives the PZT material of a MEMS based SS mirror). Similarly, the SS feedback signal 122 may be a digital signal that is provided by a sense circuit in the SS Mirror 120, where the sense circuit may be configured to convert an analog signal (e.g., a voltage or current sensed from PZR material of a MEMS based mirror) into a digital signal that is provided to SS controller 160.

In the inner control loop 210, the FB gain block 215 may be utilized to set the overall loop gain. If the SS Mirror 120 gain in one device (e.g., a VR headset) is higher than a nominal value, the feedback gain can be reduced by FB gain block 215 to maintain the overall desired loop gain. In this way, the gain of the SS Mirror 120 can be "normalized" to maintain the inner loop as stable and consistent, even with variations from different MEMS device assemblies, with variations in gain from the different MEMS mirrors, drive and sense circuits. However, the variations in gain may change due to other factors such as a degradation of material that occurs as the MEMS assembly is used, as well as other variations that occur such as temperature and humidity variations.

The SS Mirror 120 may be implemented as a MEMS assembly, which may include a Lead Zirconate Titanate (PZT) material, a MEMS mirror, and a piezo-resistive (PZR) material. The PZT material is a piezo-electric driver (or actuator) that is configured to drive the MEMS mechanical mirror in the SS Mirror 120 in response to a signal (e.g., a voltage, current) from the drive circuit of the SS Mirror 120. The PZR material is configured as a piezo-resistive sensor that generates a feedback signal from the SS Mirror 120 based on the position or angle of the MEMS mirror via the operation of the PZR material with the sense circuit in the SS Mirror 120. Thus, the gain through the MEMS assembly can be defined as PZT drive gain (open angle/drive voltage) *PZR gain (feedback voltage/open angle).

As stated previously, Notch Filter 213 is selected to suppress undesired resonance modes in the SS Mirror 120. The design of Notch Filter 213 for suppression of undesired resonance modes requires a filter design that closely matches the SS mirror resonance in the frequency domain. However, the SS Mirror 120 and other system components may vary in performance due to manufacturing variations, temperature and humidity variations, and external vibrations. These variations in performance, may cause a significant shift in the resonance modes of the SS mirror relative to the notch filter's design frequency and stop band (e.g., 3 dB bandwidth). The mismatch between the notch filter frequency and the fundamental frequency of the SS mirror may be exhibited as a significant and undesirable ripple in the SS mirror trajectory, resulting in poor image quality and distortion in the resulting LBS display device.

While notch filter may be effective for suppression when exactly matched to the resonances of SS Mirror 120, the overall design of the filter is very sensitive and mismatches between the SS Mirror 120 and the notch filter frequency can result in undesirable effects.

Figure 12:
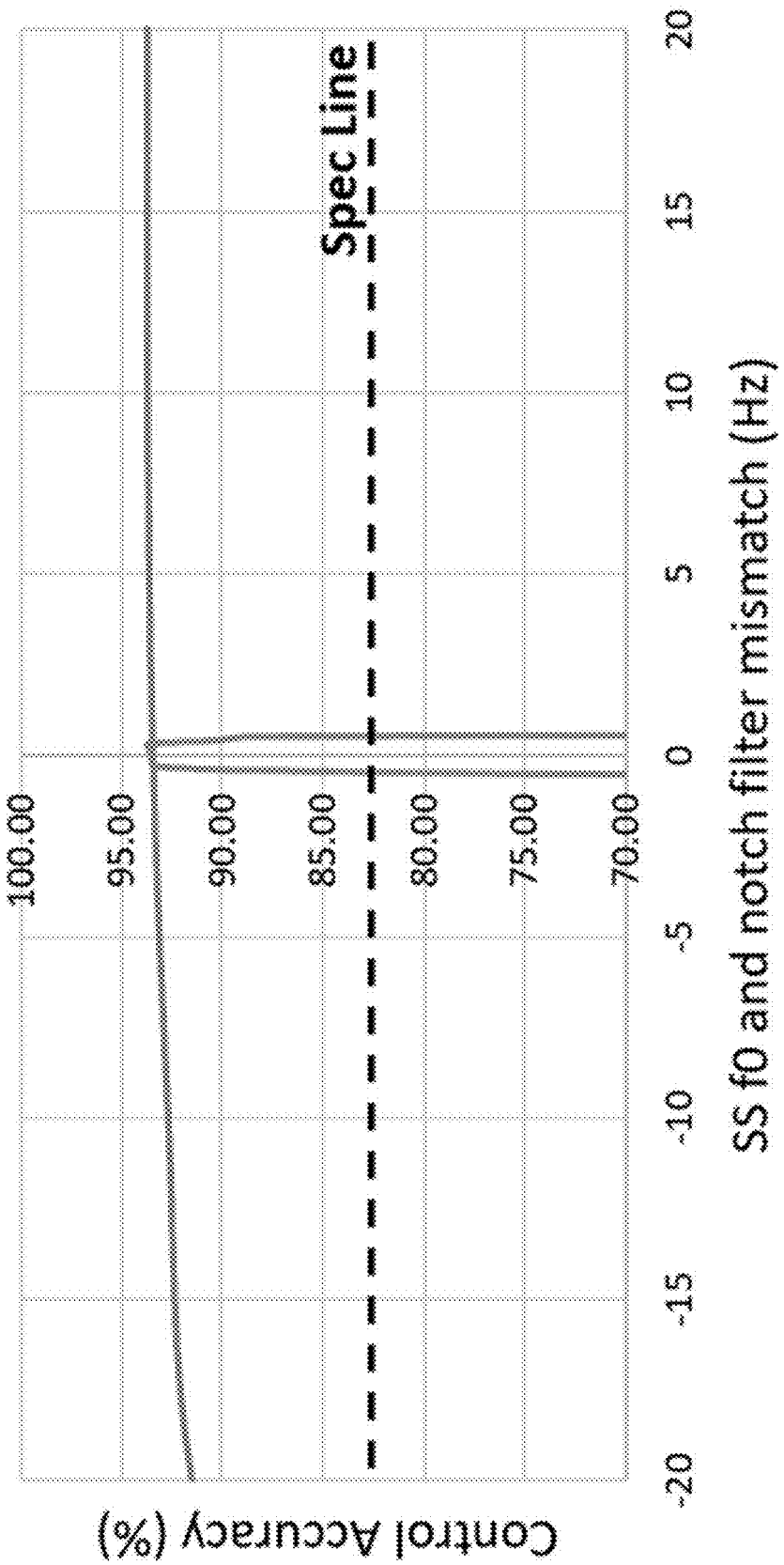
FIG. 12 shows a waveform diagram of an example performance measurement for a laser beam scanning display device with adaptive notch compensation.

FIG. 12 shows a waveform diagram of an example performance measurement for a laser beam scanning display device with adaptive notch compensation. As shown in FIG. 12, a mismatch between the SS Mirror 120 fundamental resonance ($f_0$) and the notch frequency of about 0.5 Hz mismatch may be sufficient to put SS control accuracy out of spec. As all implementations invariably have tolerances, this 0.5 Hz tolerance may be considered a strict requirement for a conventional notch filter implementation.

Figure 3:
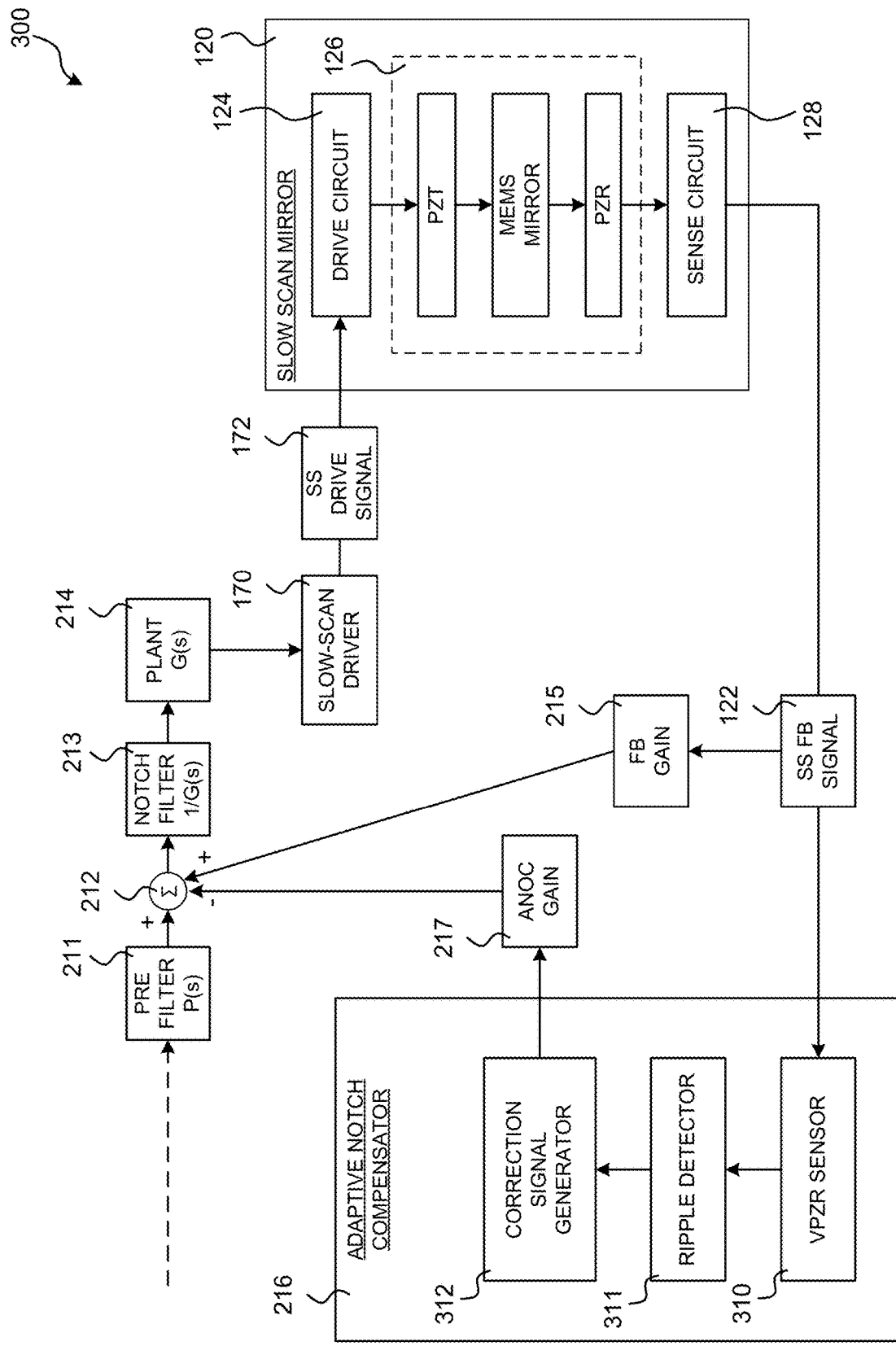
FIG. 3 shows a partial view of a slow-scan controller for a laser beam scanning display device with an example adaptive notch compensator.
Figure 13:
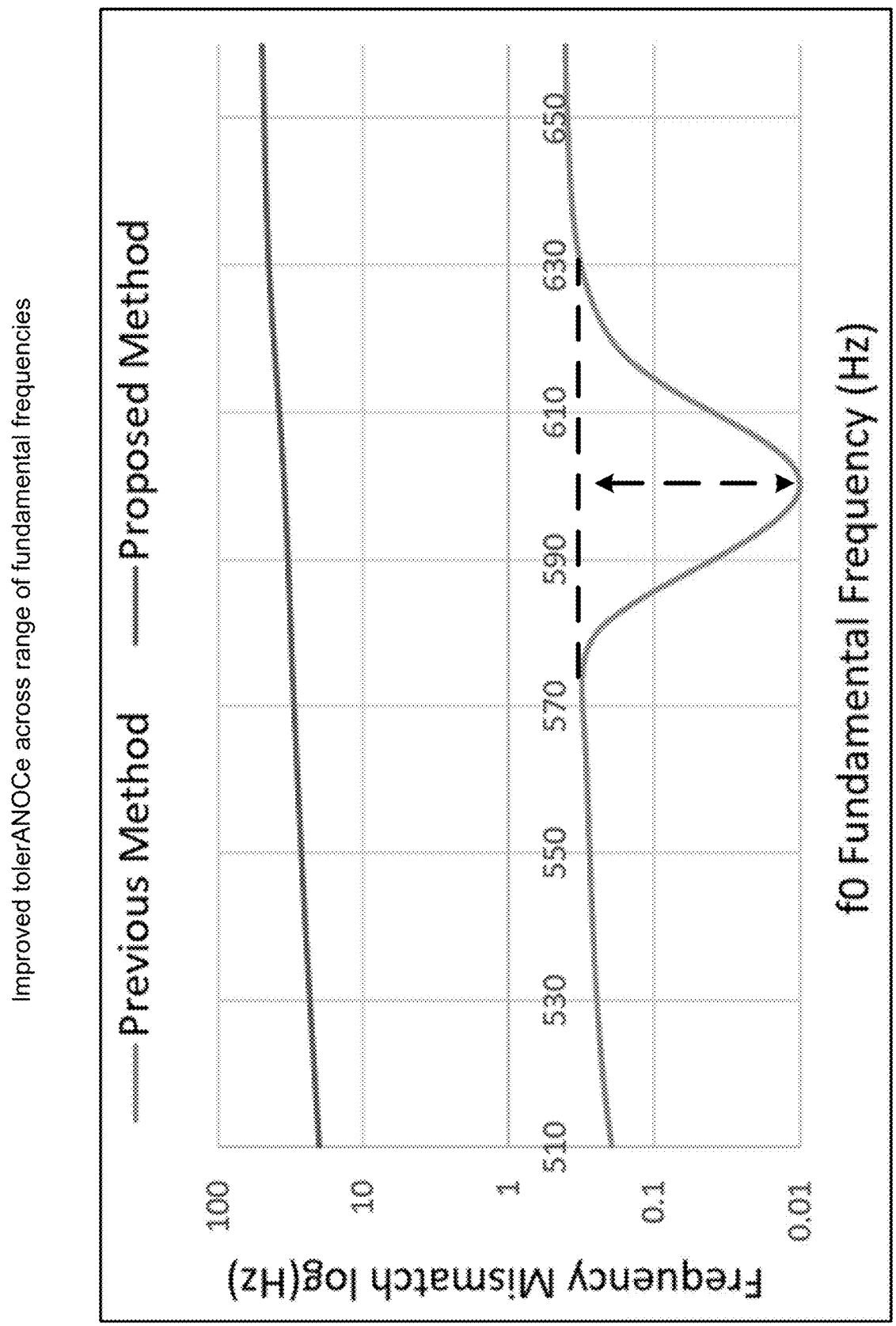
FIG. 13 shows a waveform diagram of another example performance measurement for a laser beam scanning display device with adaptive notch compensation.

The amount of tolerance may also be dependent on frame rate of the LBS device. FIG. 13 shows a waveform diagram of another example performance measurement for a laser beam scanning display device with adaptive notch compensation. As shown in FIG. 3, the fundamental freq. ($f_0$) of the SS Mirror 120 may be a harmonic of the frame rate. For example, for a frame rate of 120 Hz, and a fundamental resonance freq. ($f_0$) of 600 Hz, the relationship can be given as f0=600 Hz=5*120 Hz (frame rate). Consequently, a frequency mismatch in this example for a 0.5 Hz design requirement yields a greatly reduced tolerance of 0.01 Hz, as shown by the DIP at 600 Hz, making it impractical for implementation.

However, the controller design described herein, such as FIGS. 1 and 2 which include the ANOC 216, the sensitivity is greatly reduced by additional feedback provided by ANOC 216 in the inner loop. The two feedback paths in the inner loop (one from the SS FB signal via the FB Gain, and the other from the SSFB signal via the ANC) maintain the stability and linearity of the trajectory of the SS Mirror 120.

Although various features in FIG. 2 are illustrated as separate blocks, the blocks may be combined into fewer blocks, or divided out into additional blocks. As an illustration, the function of Summer 212 may be a considered a functional feature that can be may be implemented as two separate summers, one summer to combine the output of ANOC 216 (or the output of ANOC Gain 217) with the SS FB Signal 122 (or the output of FB Gain 215), which is then provided as one signal input to a second summer in the feedback path such as Summer 212. Thus, the functional blocks are merely provided as an example, and the overall functions can be partitioned or combined differently to achieve a desired implementation.

FIG. 3 shows a partial view of a slow-scan (SS) controller for a laser beam scanning display device 300 with an example adaptive notch compensator. LBS device 300 includes similar functional components to those illustrated FIGS. 1 and 2, including SS Driver 170, SS Mirror 120, prefilter 211, Summer 212, Notch Filter 213, Plant 214, FB Gain 215 and ANOC Gain 217.

SS Mirror 120 in FIG. 3 includes a Drive Circuit 124, a MEMS assembly 126 and a Sense Circuit 128. The MEMS assembly 126 may include a Lead Zirconate Titanate (PZT) material, a MEMS mirror, and a piezo-resistive (PZR) material. The PZT material is a piezo-electric driver (or actuator) that is configured to drive the MEMS mechanical mirror in the SS Mirror 120 in response to a signal (e.g., a voltage, current) from the Drive Circuit 124 of the SS Mirror 120. The PZR material is configured as a piezo-resistive sensor that generates a feedback signal from the SS Mirror 120 based on the position or angle of the MEMS mirror via the operation of the PZR material with the Sense Circuit 128 in the SS Mirror 120. The PZT driver material is responsive to SS Drive Signal 172 to drive the MEMS mirror to direct the laser beam to the display region to generate the image, and the PZR sensor material is responsive to the motion of the MEMS mirror to generate SS FB Signal 122.

ANOC 216 for FIG. 3 includes blocks for a VPZR Sensor 310, a Ripple Detector 311, and a Correction Signal Generator 312. VPZR Sensor 310 includes an input that is coupled to the SS FB signal from SS Mirror 120. An output of VPZR Sensor 310 is coupled to an input of Ripple Detector 311. An output of Ripple Detector 311 is coupled to an input of Correction Signal Generator 312. An output of Correction Signal Generator 330 is coupled to an input of ANOC Gain 217.

At a high level, the ANOC 216 is configured to sense VPZR measurements from a frame of a complete ramp, identify a ripple in the measurements that is associated with a mismatch between the SS Mirror 120 and the Notch Filter 213, and generate a correction signal to modify all of the points in the waveform of the SS Drive Signal 172 such that the impact on the ripple is effectively eliminated. Thus, in some examples, ANOC 216 generates a correction signal to intentionally distort the waveshape of the SS Drive Signal 172 so that the overall response of the SS Mirror 120 appears as though the notch filter matched the frequency of the SS Mirror 120. ANOC 216 is an optional block that can be used to scale the effect of the correction signal but may not be required in many implementations. Moreover, the sign of the output may of ANOC 216 may need to be reversed depending on the correction signal generated by the ANOC 216 relative to the drive signal waveform at the Summer 212

Figure 9:
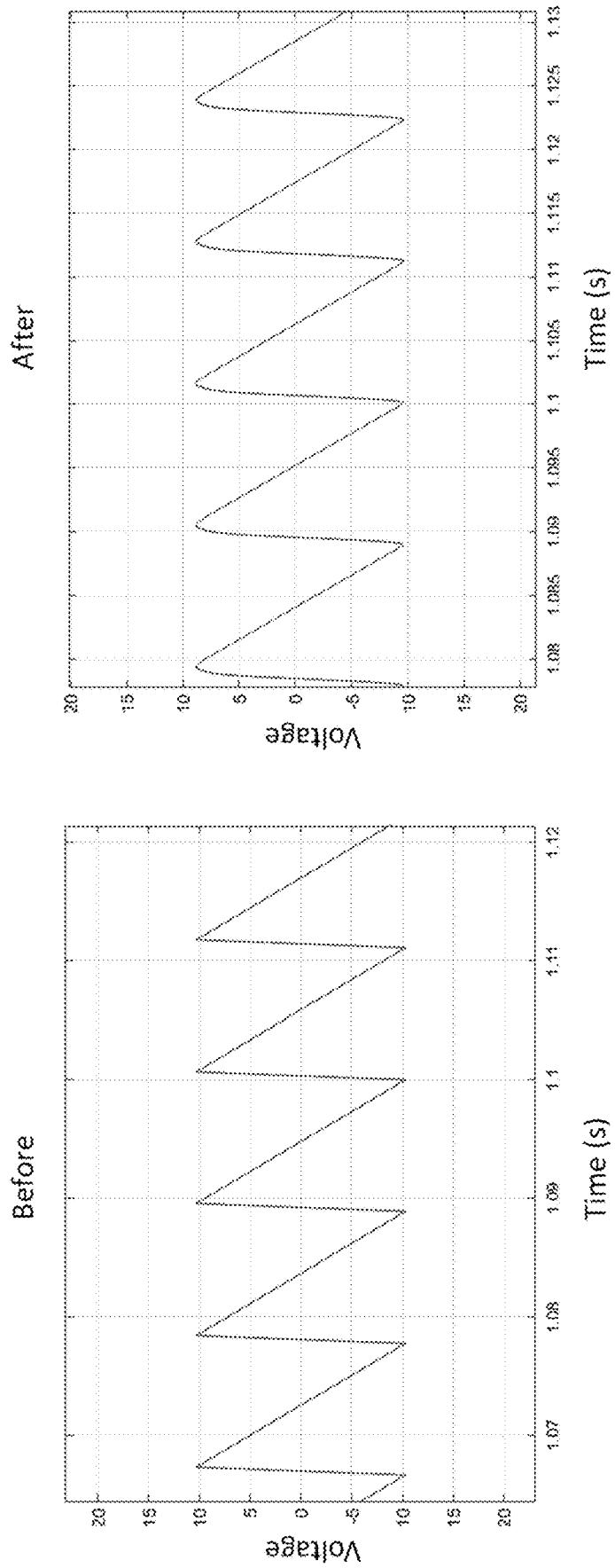
FIG. 9 shows a waveform diagram of an example slow-scan drive signal for a laser beam scanning display device with adaptive notch compensation.

FIG. 9 shows a waveform diagram of an example SS Drive Signal 172 for a laser beam scanning display device with adaptive notch compensation. As shown in the "Before" waveform diagram, the drive signal to the SS mirror appears as a sharply edged sawtooth waveform (or display ramp). Assuming the Notch Filter 213 and the SS Mirror 120 had precisely matched resonant frequencies, the sharply edged linear ramp of the SS Drive Signal 172 would be ideal. However, when a mismatch occurs, a ripple may be exhibited that requires correction. For this example, ANOC 216 generates a correction signal that is summed in the inner-feedback loop and effectively distorts the waveform of the SS Drive Signal 172 as is shown in the "After" waveform diagram of FIG. 9. Notice that the edges of the "After" waveform are no longer sharp, and the ramps are not perfectly linear. These distortions will have the overall effect to reduce or eliminate the ripple in the trajectory of the SS Mirror 120, as may be observed by the SS FB Signal 122.

Figure 10:
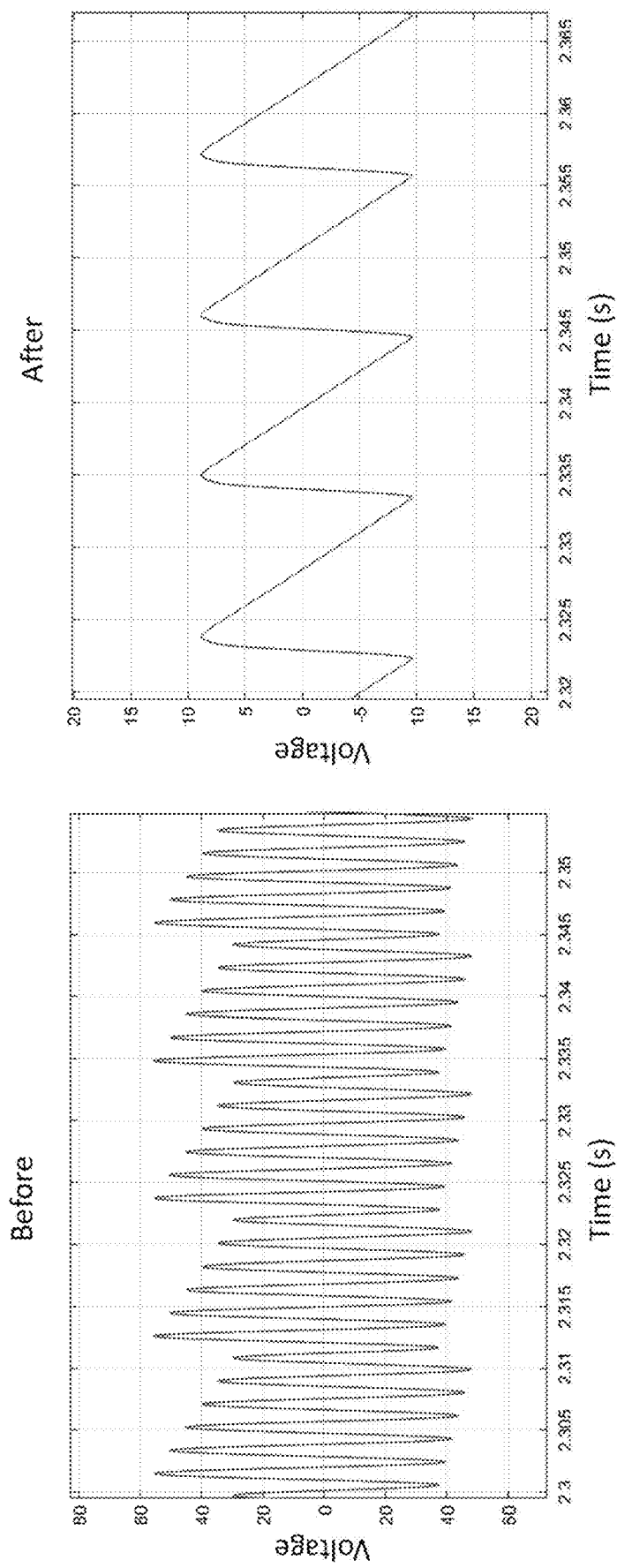
FIG. 10 shows a waveform diagram of an example slow-scan feedback signal for a laser beam scanning display device with adaptive notch compensation.

FIG. 10 shows a waveform diagram of an example SS FB Signal 122 for a laser beam scanning display device with adaptive notch compensation. The SS FB Signal 122 includes the VPZR measurements from the SS Mirror 120. In the left hand "Before" waveform, the signal does not appear as a ramp due to a mismatch in the frequency of Notch Filter 213 and the resonance of the SS Mirror 120, and instead exhibits a ripple in the SS FB Signal 122. The operation of ANOC 216 again counteracts this observed ripple and adjusts the drive signal such that the "After" waveform on the right side of FIG. 10 is realized, where the ripple is removed from the SS FB Signal, (and the corresponding VPZR measurements) by the real-time operation of ANOC 216.

Returning to FIG. 3, the VPZR sensor 310 is configured to receive the SS FB Signal 122 from SS Mirror 120. The SS FB Signal 122 includes measurements associated with the SS Mirror operated over a complete display frame. The VPZR sensor 310 may be configured to receive an analog signal as the SS FB signal. For analog signals, the VPZR sensor may include one or more analog circuit functions such as a buffer, an amplifier, a sample-hold, a filter, or an analog-to-digital converter. In other examples VPZR sensor 310 may be configured to receive a digital signal as the SS FB Signal 122. For digital signals, the VPZR sensor may include a buffer that captures a frame of data, along with any other required logic, latches, or other digital circuit functions that may be required. A display ramp typically includes a flyback or retrace portion which may not contain any meaningful measurements, and thus those portions may not need to be considered for the adjustment.

Ripple Detector 311 is configured to receive the output signal from the VPZR sensor, which may correspond to either an analog or a digital signal depending on the specific implementation of the VPZR sensor. In a simple implementation, the Ripple Detector 311 simply receives an analog buffered version of the SS FB signal; while in other implementations Ripple Detector 311 receives a digitally buffered version of the measurements from the SS FB signal. Other examples are also contemplated such as analog or digital filters, amplitude detectors, amplifiers, limiters, comparators, etc.

Correction Signal Generator 312 is configured to receive the output of Ripple Detector 311, and to generate a correction signal that in effect adjusts each point of the SS Drive Signal 172 to mitigate the ripple effects found at that point in the responsive measurement from the SS Mirror 120. The ripple effects that are observed correspond to an error between the ideal ramp signal and the measured output for the ideal signal. In a simple implementation, the Correction Signal Generator 312 may generate the correction signal with a look-up table that identifies a specific adjustment value for each point based on the determined error.

Although various functions in FIG. 3 are illustrated as separate blocks, the blocks may be combined into fewer blocks, or divided out into additional blocks. As an illustration, the ANOC 216 of FIG. 3 is shown as three distinct blocks 310, 311, 312 in FIG. 3, where these functions may be combined into fewer blocks, or divided out into additional blocks. As another example, the function of ANOC Gain 217 may be included as part of ANOC 216. As an additional example, the function of Summer 212 may be a considered a functional feature that can be may be implemented as two separate summers, one summer to combine the output of ANOC 216 (or the output of ANOC Gain 217) with the SS FB Signal 122 (or the output of FB Gain 215), which is then provided as one signal input to a second summer in the feedback path such as Summer 212. Thus, the functional blocks are merely provided as examples, and the overall functions can be partitioned or combined differently to achieve a desired implementation.

Figure 11:
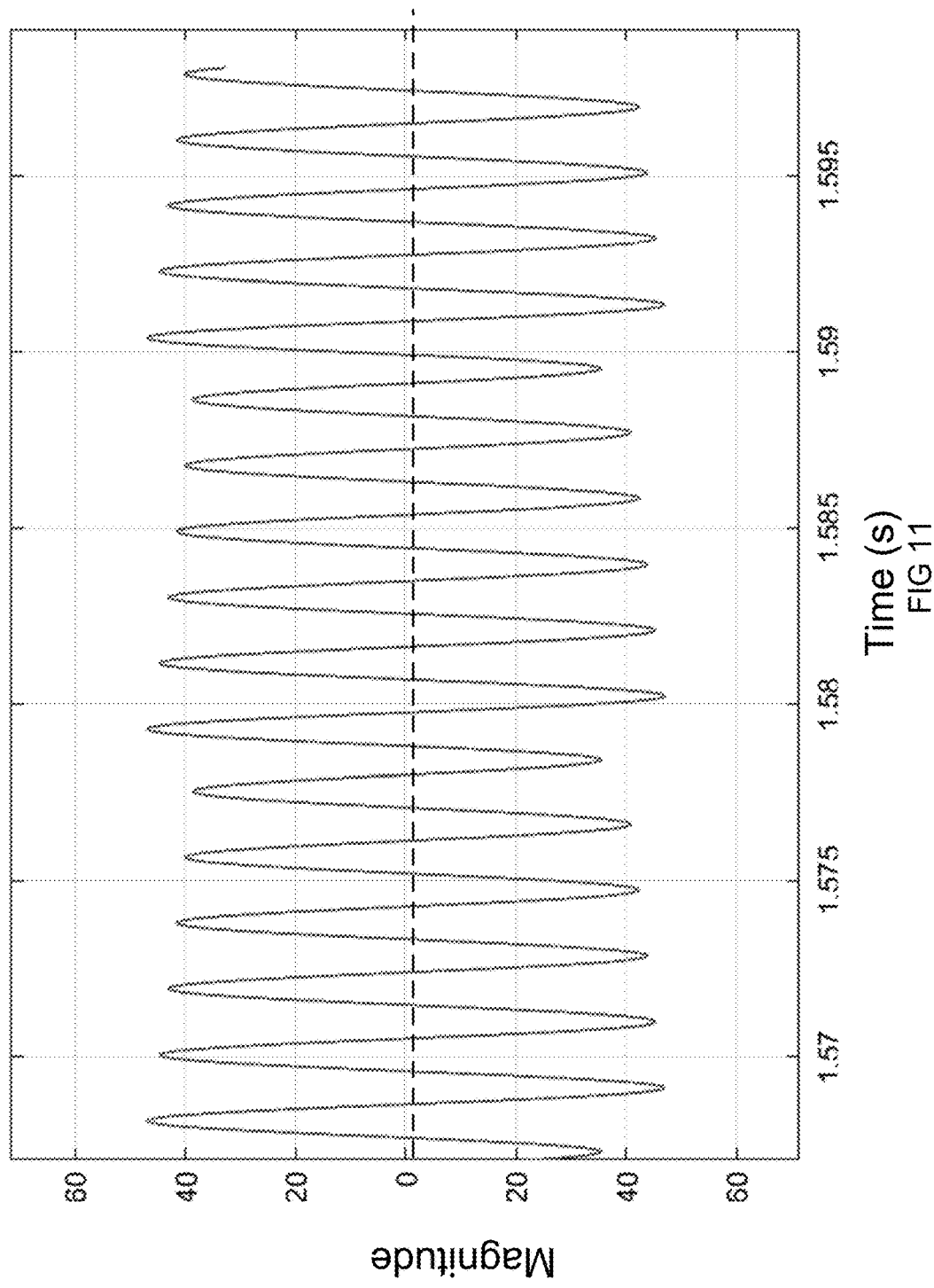
FIG. 11 shows a waveform diagram of an example error signal for a laser beam scanning display device with adaptive notch compensation.

FIG. 11 shows a waveform diagram of an example error signal for a laser beam scanning display device with adaptive notch compensation. The error signal appears as a type of oscillating signal in time, where the magnitude of the signal at each point indicates an error between the ideal SS mirror that is matched to a notch filter, and a non-ideal response observed in the measurement by VPZR data. As observed, the error signal oscillates above and below the dashed line at zero error, and the magnitude of the error indicates the amount of correction that needs to be applied at that particular point. In other words, for each point in time where the error magnitude is zero, no adjustment needs to be made to the SS drive signal waveform; and for each magnitude above or below the zero line, adjustments will be made to the SS drive signal by ANOC 216.

Figure 4:
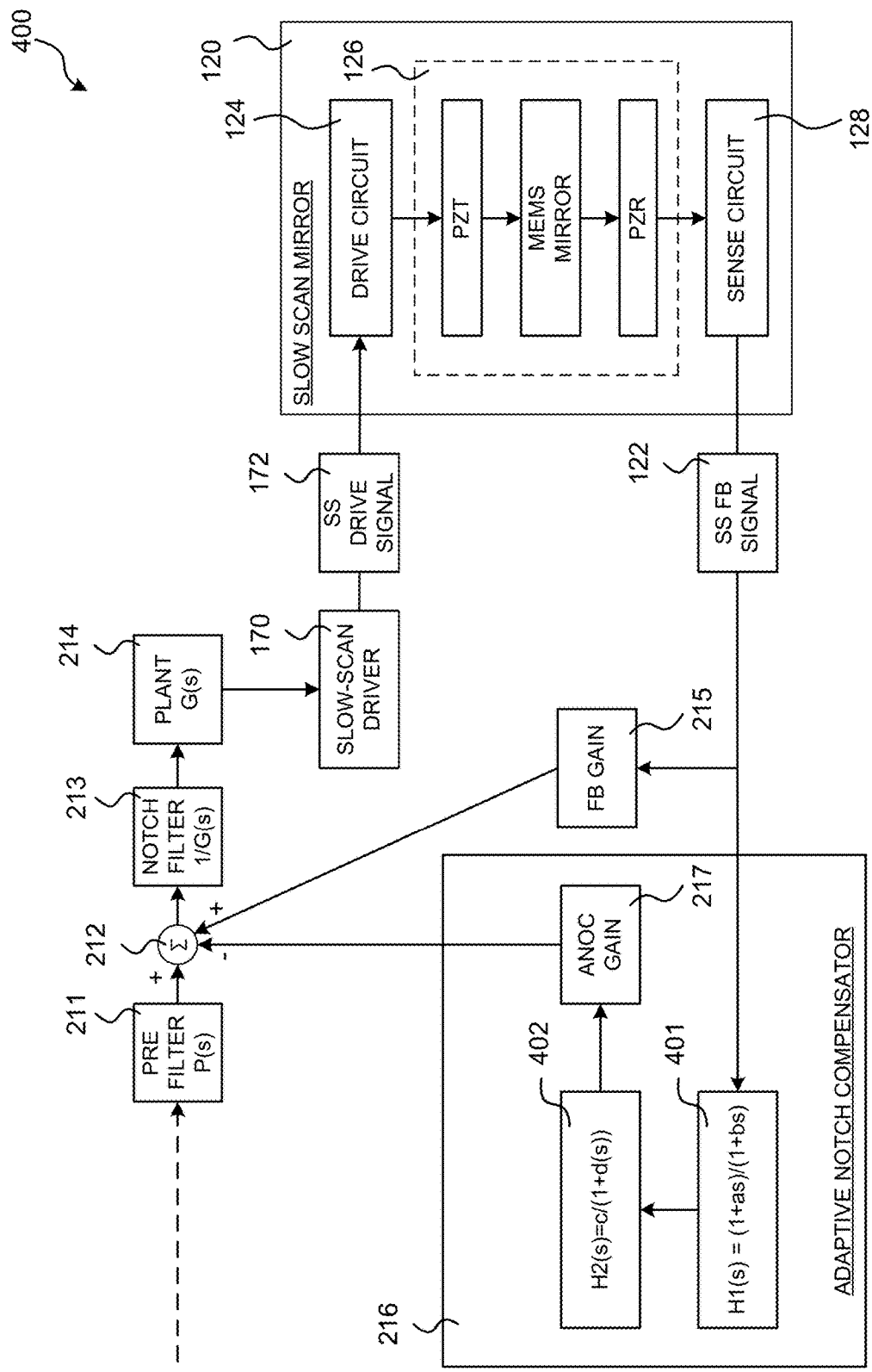
FIG. 4 shows a partial view of a slow-scan controller for a laser beam scanning display device with another example adaptive notch compensator.

FIG. 4 shows a partial view of a slow-scan controller for a laser beam scanning display device 400 with another example adaptive notch compensator. LBS device 400 includes similar functional components to those illustrated FIGS. 1, 2 and 3, including SS Driver 170, SS Mirror 120, prefilter 211, Summer 212, Notch Filter 213, Plant 214, FB Gain 215, ANOC Gain 217, and SS Mirror 120.

ANOC 216 of FIG. 4 is shown as including blocks for ANOC Gain 217, Filter 401, and Filter 402. SS FB Signal 122 from the SS Mirror 120 is coupled to an input of Filter 401. An output of Filter 401 is coupled to an input of Filter 402. An output of Filter 402 is coupled to an input of ANOC Gain 217.

ANOC 216 of FIG. 4 is shown as a time-domain based process. For example, Filter 401 and Filter 402 are given as time-domain filters, with transfer functions designated as $H_1(s)$ and $H_2(s)$, respectively. The transfer function $H_1(s)$ for Filter 401 is given as: $H_1(s)=(1+as)/(1+bs)$, while the transfer function $H_2(s)$ for Filter 402 is given as $H_2(s)=c/(1+ds)$; where a, b, c, and d are constants the define the filter coefficients. ANOC Gain 217 may be optionally provided to give another scaling factor (e.g., G), while in other implementations ANOC Gain 217 may be eliminated. The overall transfer function of ANOC 216 may be given as:

$$H(s)=G*H_1(s)*H_2(s)$$

or $$H(s) = G * \frac{c*(1+as)}{(1+bs)(1+ds)}$$

As illustrated above, H(s) is a time-domain transfer function that is determined by coefficients for Filter 401, Filter 402 and the gain coefficient for ANOC Gain 217. Although the ANOC 216 is illustrated as three distinct blocks 401, 403, 217, these functions may be combined into fewer blocks, or divided out into additional blocks. Moreover, these specific blocks may be implemented as analog based time-domain solutions (e.g., active or passive analog filters, amplifiers, summers, multipliers, components, etc.), or digitally based time-domain solutions (e.g., DSP based filters, amplifiers, summers, multipliers, etc.). Moreover, the specific functions for ANOC 216 may be implemented as either discrete solutions (e.g., discrete circuit components), integrated solutions (e.g., one or more individual microchips) based solution, or combinations thereof.

Figure 5:
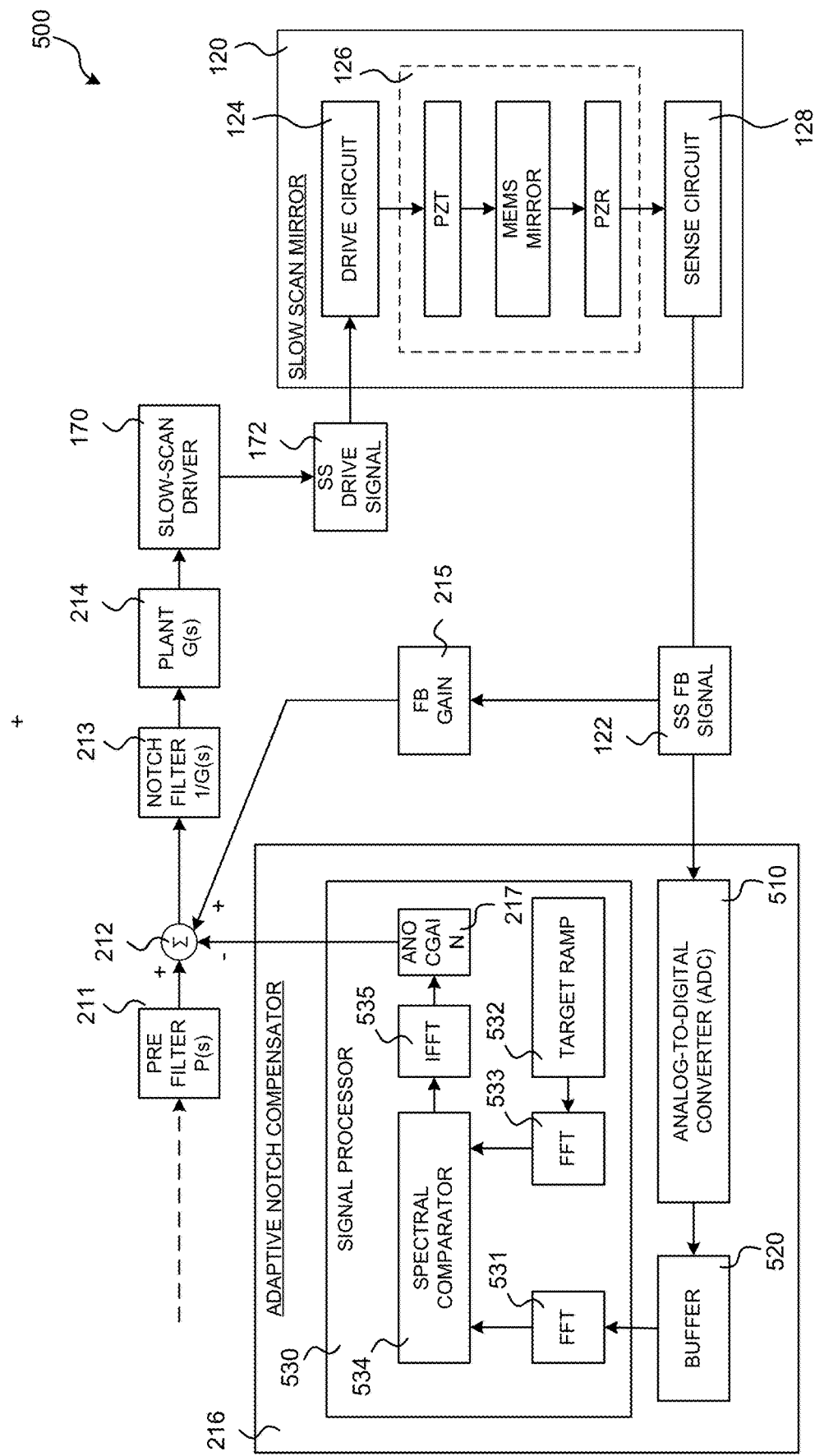
FIG. 5 shows a partial view of a slow-scan controller for a laser beam scanning display device with still another example adaptive notch compensator.

FIG. 5 shows a partial view of a slow-scan controller for a laser beam scanning display device 500 with still another example adaptive notch compensator. LBS device 500 includes similar functional components to those illustrated FIGS. 1-4, including SS Driver 170, SS Mirror 120, prefilter 211, Summer 212, Notch Filter 213, Plant 214, FB Gain 215, ANOC Gain 217, and SS Mirror 120.

ANOC 216 of FIG. 5 is shown as including blocks for Analog-to-Digital Converter (ADC) 510, Buffer 520, and Signal Processor 530. The feedback signal from SS Mirror 120, SS FB Signal 122, is coupled to an input of ADC 510. An output of ADC 510 is coupled to an input of Buffer 520. An output of Buffer 520 is coupled to an input of Signal Processor 530. An output of Signal Processor 530 is coupled to an input of Summer 212.

Signal Processor 530 further includes blocks for a Fast Fourier Transform (FFT) 531, a Target Ramp 532, a FFT 533, a Spectral Comparator 534, an Inverse Fast Fourier Transform (IFFT) 535, and an ANOC Gain 217. An output of Buffer 520 is coupled to an input of FFT 531. An output of Target Ramp 532 is coupled to an input of FFT 533. An output of FFT 531 is coupled to an input of Spectral Comparator 534. An output of FFT 533 is coupled to another input of Spectral Comparator 534. An output of Spectral Comparator 534 is coupled to an input of IFFT 535. An output of IFFT 535 is coupled to an input of ANOC Gain 217. The output of ANOC Gain 217 is coupled to an input (e.g., the minus input) of the Summer 212.

ANOC 216 of FIG. 4 is shown as a frequency-domain based process, which may be implemented by a DSP in some examples. ADC 510 may be required in implementations where SS FB Signal 122 corresponds to an analog signal that needs to be converted into a digital value prior to processing by ANOC 216. In other implementations where SS FB Signal 122 is a digital signal, the ADC 510 may be eliminated. The output of ADC 510 is captured by the buffer 520 for a frame of VPZR measurement data that is extracted from the SS FB signal 122. The frame of the VPZR measurement data is converted from a time-domain signal into a frequency domain spectral measurement by FFT 531 in the Signal processor 530. Similarly, FFT 533 converts data for an ideal or target ramp signal from a time-domain signal into a frequency domain spectral measurement.

The Spectral Comparator 534 compares the frequency domain spectral measurements and generates a spectral difference in the frequency domain. The spectral difference corresponds to an observed difference between the frequency spectrum of an ideal signal and the frequency spectrum of the measured response of the SS Mirror 120 from the SS FB signal. IFFT 535 converts the spectral difference into a correction signal in the time-domain, which can then be optionally gain scaled by ANOC Gain 217 before being combined with the original driver signal by Summer 212.

Although the ANOC 216 is illustrated as three distinct blocks 510, 520, 530, these functions may be combined into fewer blocks, or divided out into additional blocks. For example, another gain block (not shown) could be added at the input side of ADC 510 to improve the dynamic range for the ADC process. In another example, ANOC Gain 217 may be eliminated as unnecessary or moved outside of the Signal Processor 530. In some additional examples, the Target Ramp 532 and FFT 533 may be replaced by a lookup table that includes a spectral fingerprint of an ideal ramp signal. In yet another example, the ADC 510 and buffer 520 may be implemented as part of Signal processor 530. The specific partitions between the various blocks of FIG. 5 may be implemented as any combination of analog or digital based solutions that collectively provide for a spectral comparison between an ideal or target ramp signal and the measured response from the SS mirror 120 from the SS FB signal.

As described above, the specific blocks of FIGS. 1-6 are provided as examples, which may be separated into additional blocks or combined into fewer blocks to achieve a desired implementation. Additionally, the specific implementation may correspond to an analog based time-domain solutions (e.g., active or passive analog filters, amplifiers, buffers, summers, multipliers, comparators, oscillators, limiters, switches or other components, etc.), a digitally based time-domain solutions (e.g., digital or DSP based filters, amplifiers, buffers, latches, summers, multipliers, comparators, oscillators or clocking circuits, etc.), or a spectral based frequency domain solution. The specific functions of FIGS. 1-6 may be implemented as either discrete solutions (e.g., discrete circuit components), integrated solutions (e.g., one or more individual microchips) based solution, or combinations thereof.

Figure 6:
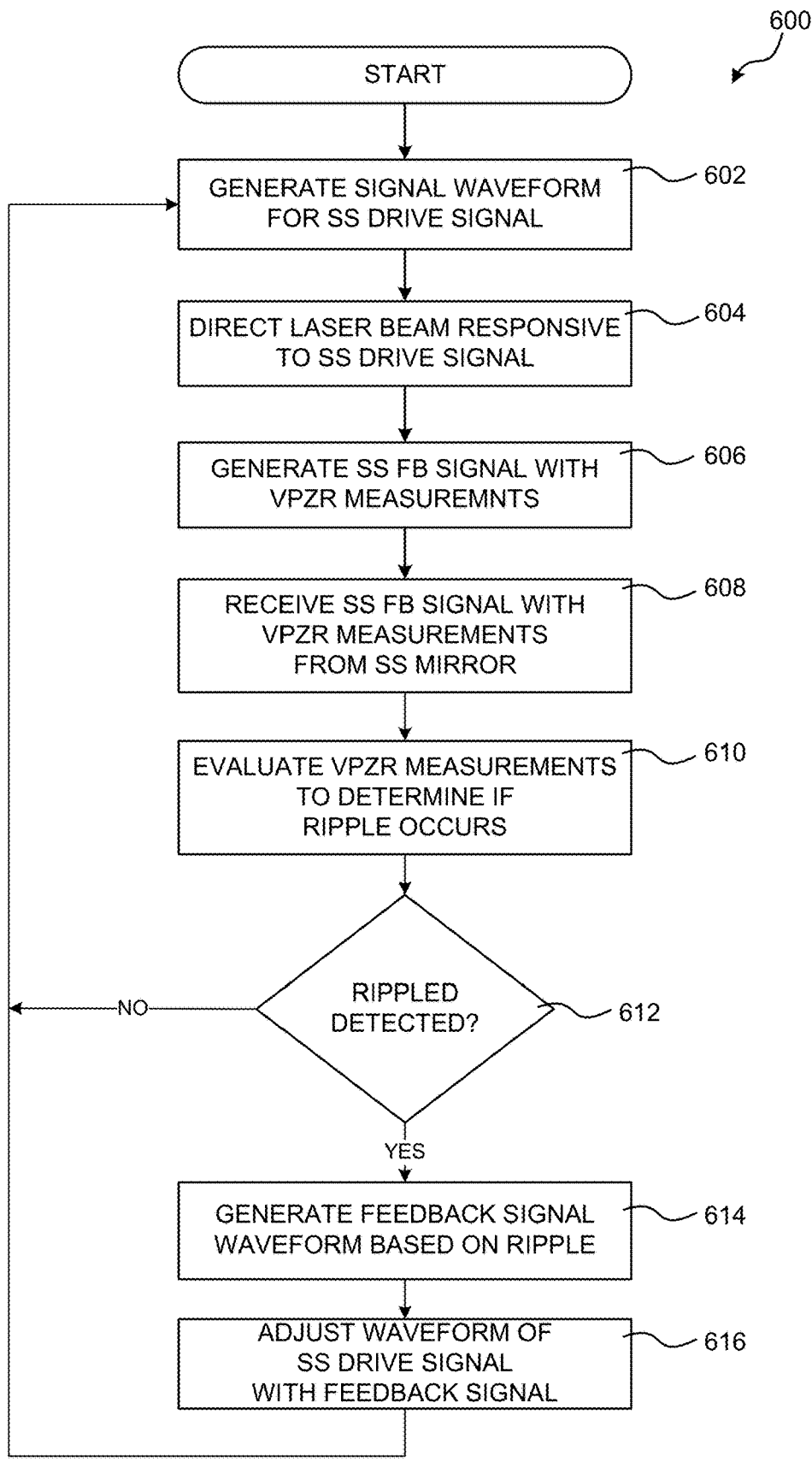
FIG. 6 shows a flow chart of an example method for a laser beam scanning display device with adaptive notch compensation.
Figure 7:
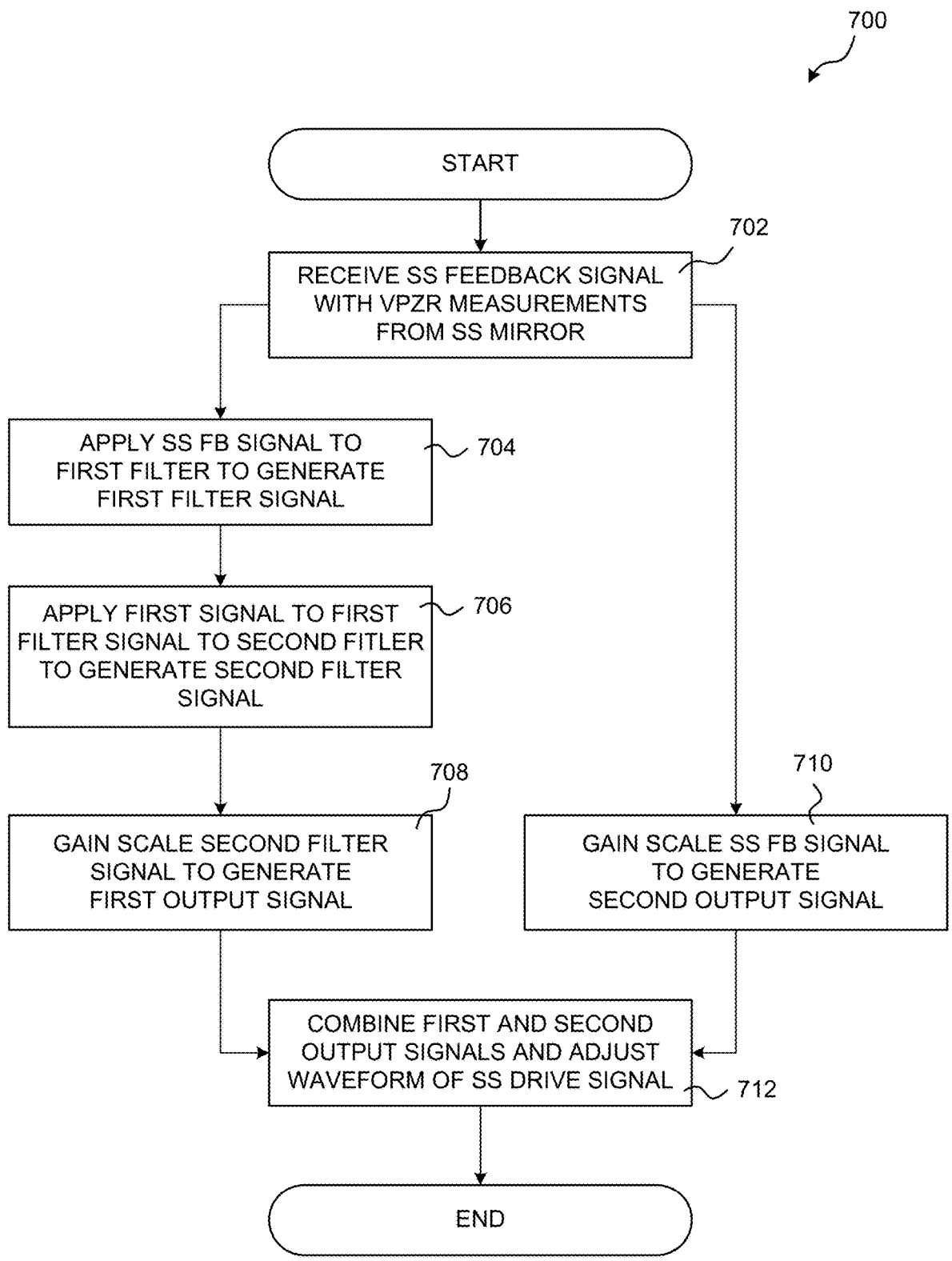
FIG. 7 shows a flow chart of another example method for a laser beam scanning display device with adaptive notch compensation.
Figure 8:
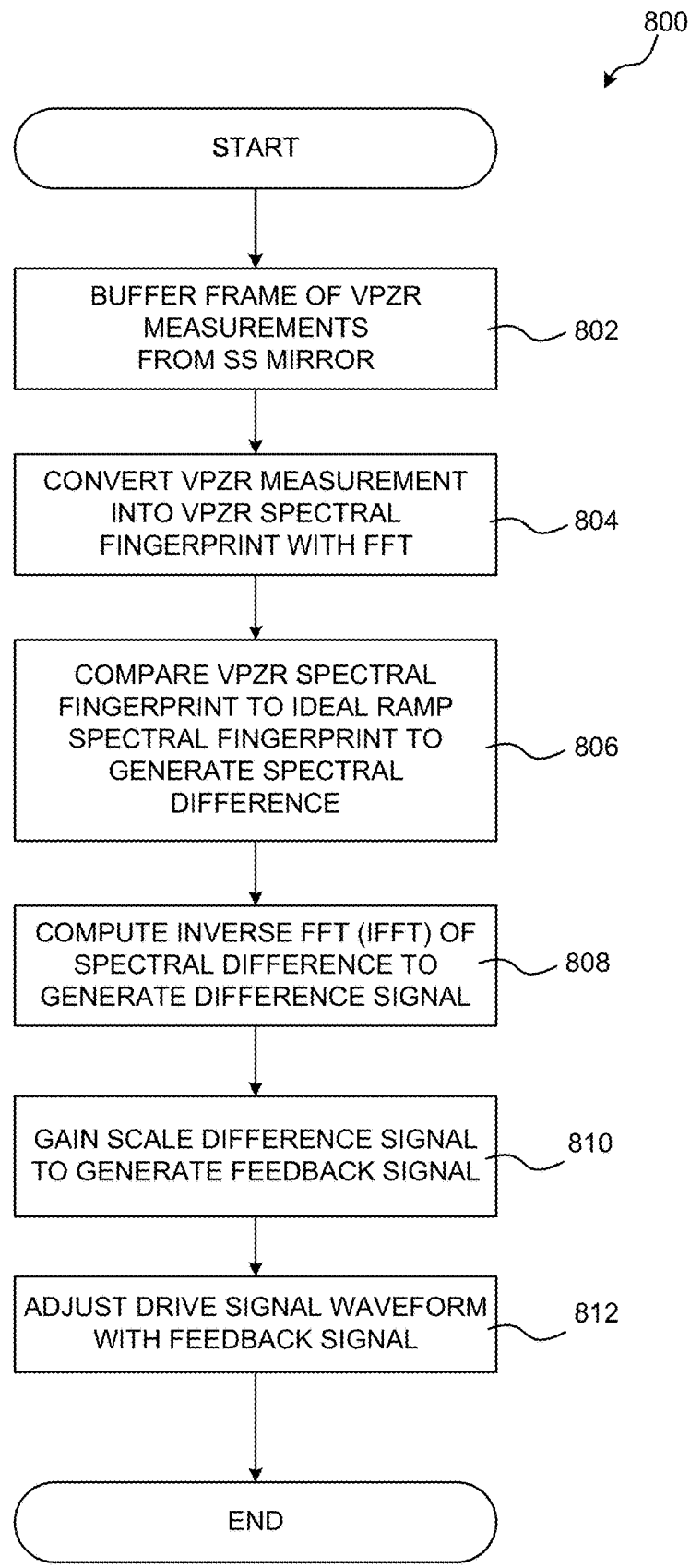
FIG. 8 shows a flow chart of yet another example method for a laser beam scanning display device with adaptive notch compensation.

FIGS. 6-8 show flowcharts of example methods that illustrate aspects of adaptive notch filter compensation for an example laser beam scanning (LBS) display device.

It should be appreciated that the particular implementation of the technologies disclosed herein is a matter of choice dependent on the performance and other requirements of the computing device. Accordingly, the logical operations described herein are referred to variously as states, operations, structural devices, acts, or modules.

These states, operations, structural devices, acts and modules can be implemented in hardware, software, firmware, in special-purpose digital logic, and any combination thereof. It should be appreciated that more or fewer operations can be performed than shown in the FIGS. and described herein. These operations may also be performed in a different order than those described herein, and in many instances, operations may be performed in parallel.

FIG. 6 shows a flow chart of an example method 600 for a laser beam scanning display device with adaptive notch compensation. Aspects of method 600 may refer to the examples described above with reference to FIGS. 1-5.

Method 600 begins at operation 602, "GENERATE SIGNAL WAVEFORM FOR SLOW-SCAN DRIVE SIGNAL", where a slow scan signal waveform may be generated for the SS Drive Signal 263 by a Signal Generator 201 of a SS Controller 150. Method 600 proceeds from operation 602 to operation 604, "DIRECT LASER BEAM RESPONSIVE TO SS DRIVE SIGNAL", where a Laser Beam 112 may be directed towards a Display Region 140 responsive to the SS Drive Signal 172. Method 600 proceeds from operation 604 to operation 606, "GENERATE SS FB SIGNAL WITH VPZR MEASUREMNTS", where the SS FB Signal 122 is generated by a SS Mirror 120 responsive to the position of the SS Mirror 120 based on the SS Drive Signal 172, where the SS FB Signal 122 includes the VPZR measurements therein. Method 600 proceeds from operation 606 to operation 608, "RECEIVE SS FB SIGNAL WITH VPZR MEAUREMENTS FROM SS MIRROR", where the ANOC 216 of the SS Controller 150 receives the SS FB Signal 122, where the SS FB Signal 122 includes the VPZR measurements therein. Method 600 proceeds from operation 608 to operation 610, "EVALUATE VPZR MEAUREMENTS TO DETERMINE IF RIPPLE OCCURS", where the ANOC 216 of the SS Controller 150 evaluates the received VPZR Measurements from the SS FB Signal 122 to determine if a ripple is found in the trajectory of the SS Mirror 120. Method 600 proceeds from operation 610 to operation 612, "RIPPLE DETECTED", which is a decision block based on the evaluation of operation 610. Method 600 proceeds from operation 612 to operation 602 when ripple is not detected at operation 612. Alternatively, Method 600 proceeds from operation 612 to operation 614 when ripple is detected at operation 612. At operation 614, "GENERATE FEEDBACK SIGNAL WAVEFORM BASED ON RIPPLE", the ANOC 216 of the SS Controller 150 generates a feedback signal that corresponds to an amount of ripple associated with the trajectory of the SS Mirror 120. Method 600 proceeds from operation 614 to operation 616, "ADJUST WAVEFORM OF SS DRIVE SIGNAL WITH FEEDBACK SIGNAL", where the output of the ANOC 216 may be combined with the waveform of the SS Drive Signal 172 by Summer 212. After operation 616, the process may begin again, such as may be required for the next display frame of the LBS.

FIG. 7 shows a flow chart of another example method 700 for a laser beam scanning display device with adaptive notch compensation. Aspects of method 700 may refer to the examples described above with reference to FIGS. 1-5.

Method 700 begins at operation 702, "RECEIVE SS FB SIGNAL WITH VPZR MEAUREMENTS FROM SS MIRROR", where the ANOC 216 of the SS Controller 150 receives the SS FB Signal 122 from the SS Mirror 120, where the SS FB Signal 122 includes the VPZR measurements therein. Method 700 proceeds from operation 702 to operation 704, "APPLY SS FB SIGNAL TO FIRST FILTER TO GENERATE FIRST FILTER SIGNAL", where ANOC 216 applies Filter 401 to the received SS FB Signal 122 and generates a responsive first filter output signal. The transfer function of Filter 401 for this example may correspond to $H_1(s)$ as described previously above. Method 700 proceeds from operation 704 to 706. "APPLY FIRST SIGNAL TO FIRST FILTER SIGNAL TO SECOND FILTER TO GENERATE SECOND FILTER SIGNAL", where ANOC 216 applies Filter 402 to the output of Filter 401 and generates a responsive second filter output signal. Method 700 proceed from operation 706 to operation 708, "GAIN SCALE SECOND FILTER SIGNAL TO GENERATE FIRST OUTPUT SIGNAL", where ANOC Gain 217 receives the output of the Filter 402 and generates a first output signal that is a gain scaled version of the output signal from Filter 402. Method 700 may proceed from operations 708 to operation 712. Method 700 may also proceed from operation 702 to operation 710, "GAIN SCALE SS FB SIGNAL TO GENERATE SECOND OUTPUT SIGNAL", where FB Gain 215 receives the SS FB signal 122 from the SS Mirror 120 and generates a second output signal that is a gain scaled version of the SS FB Signal 122. Method 700 may also proceed from operation 710 to operation 712. At operation 712, "COMBINE FIRST AND SECOND OUTPUT SIGNALS TO GENERATE FEEDBACK SIGNAL", where Summer 212 receives the output signal from the ANOC Gain 217, the output signal from the FB Gain 215, the waveform of the SS Drive Signal 172, and combines the signals to adjust the waveform of the SS Drive Signal 172.

FIG. 8 shows a flow chart of yet another example method 800 for a laser beam scanning (LBS) display device with adaptive notch compensation. Aspects of method 800 may refer to the examples described above with reference to FIGS. 1-5.

Method 800 begins at operation 802, "BUFFER FRAME OF VPZR MEASUREMENTS FROM SS MIRROR", where the ANOC 216 receives the SS FB Signal 122 from the SS Mirror 120 and captures (e.g., via Buffer 520) the VPZR Measurements for a display frame to be processed by the ANOC 216. Method 800 proceeds from operation 802 to operation 804, "CONVERT VPZR MEASUREMENT INTO VPZR SPECTRAL FINGERPRINT WITH FFT", where the Signal Processor 530 of the ANOC 216 applies FFT 531 to the VPZR measurements to generate a spectral fingerprint associated with the SS FB Signal 122. Method 800 continues from operation 804 to operation 806, "COMPARE VPZR SPECTRAL FINGERPRINT TO IDEAL RAMP SPECTRAL FINGERPRINT TO GENERATE SPECTRAL DIFFERENCE", where the Signal Processor 530 of the ANOC 216 compares the spectral fingerprint of the SS FB Signal to the spectral fingerprint of an ideal ramp to generate a spectral difference. Method 800 continues from operation 806 to operation 808, "COMPUTE INVERSE FFT (IFFT) OF SPECTRAL DIFFERENCE TO GENERATE DIFFERENCE SIGNAL", where the Signal Processor 530 of the ANOC 216 computed an Inverse FFT of the spectral difference to generate a feedback signal that is a time-domain version of the difference signal. Method 800 continues from operation 810 to operation 812, "ADJUST DRIVE SIGNAL WAVEFORM WITH FEEDBACK SIGNAL", where Summer 212 receives the output signal from the ANOC 216 (or ANOC Gain 217), receives the output signal from the FB Gain 215 (or SS FB Signal 122), receives the waveform of the SS Drive Signal 172, and combines the signals to adjust the waveform of the SS Drive Signal 172.

As previously described, a mismatch between the notch frequency of the Notch Filter 213 and the resonance of the SS Mirror 120 can result in undesirable distortion and poor image quality in a LBD device. Unlike other general gain control systems, which tend to apply a single gain parameter to the entire feedback path, the presently disclosed techniques describe a method to intentionally distort the waveform of the SS Drive Signal such that the overall impact of the mismatch is reduced or eliminated. In various example device, methods, and systems described herein, individual points used in the formation of the waveform for the SS drive signal 172 may be selectively adjusted (e.g., offset or scaled by differing amounts as may be required) so that the resulting images appear as though the Notch Filter 213 and the SS Mirror 120 are matched. The solutions may be time domain-based solutions or frequency domain-based solutions as previously described.

In some examples, the adaptive notch compensation of the inner control loop may be executed in a continuous time fashion, while in other examples the adaptive notch compensation may be executed at a periodic rate (e.g., 5 Hz, 10 Hz, 15 Hz, 20 Hz, 30 Hz, 60 Hz, 90 Hz, 120 Hz, etc.).

The periodic rate may be in any range of values that are acceptable to the overall system. For example, the range may be from a lower value to a higher value, where the lower value corresponds to one of about 5 Hz, 10 Hz, 15 Hz, 20 Hz, 30 Hz, 60 Hz, 90 Hz, etc.; the upper value corresponds to one of about 10 Hz, 15 Hz, 20 Hz, 30 Hz, 60 Hz, 90 Hz, 120 Hz, etc.; where the upper value is greater than the lower value.

In some embodiments, the periodic rate may be determined relative to some multiple number of frames for the LBS display. For example, the adaptive notch compensation could be applied once for each frame (e.g., frame rate X 1), once every other frame (e.g., frame rate X 1/2), once every third frame (e.g., frame rate/3, or X1/3), etc. The design may be any multiple of the frame rate for the LBS display device (x1, X1/2, X1/3, X1/4, X1/5, X1/10), as long as the desired system performance requirements may be met. Such a periodic rate may have some benefits such as a damped response with reduced overshooting, preventing oscillation in the gain, etc.

In some additional embodiments, multiple frames may be averaged over an interval before a gain adjustment is made. For example, the adaptive notch compensation could occur after the two successive frames are averaged (e.g., frame rate/2), three successive frames are averaged (e.g., frame rate/3), etc. Again, the design is not limited and may average any number, as long as the desired system performance requirements may be met.

In a specific example, the VPZR measurement values for the individual pixels may be averaged over multiple frames during an interval, where the adaptive notch compensation is made using the averaged pixel values. The averaged values may be used to smooth out the gain adjustment and provide a damped response with reduced overshooting, preventing oscillation in the gain, etc.

The disclosed embodiments can be implemented using a number of technologies. For example, embodiments can be implemented using software/firmware (e.g., DSP, digital Si logic, FPGA, firmware, etc.), or hardware (PCB board with discrete components), or a combination of hardware and software. For example, the filters in FIG. 2 may be implemented using analog filters, wherein the poles and zeros may be adjusted by using appropriate resistors, capacitors, and other components. In another example the filters in FIG. 2 may be implemented using one or more DSP chips or embedded CPUs. The various components may be soldered on a single PCB, or a set of boards.

Figure 14:
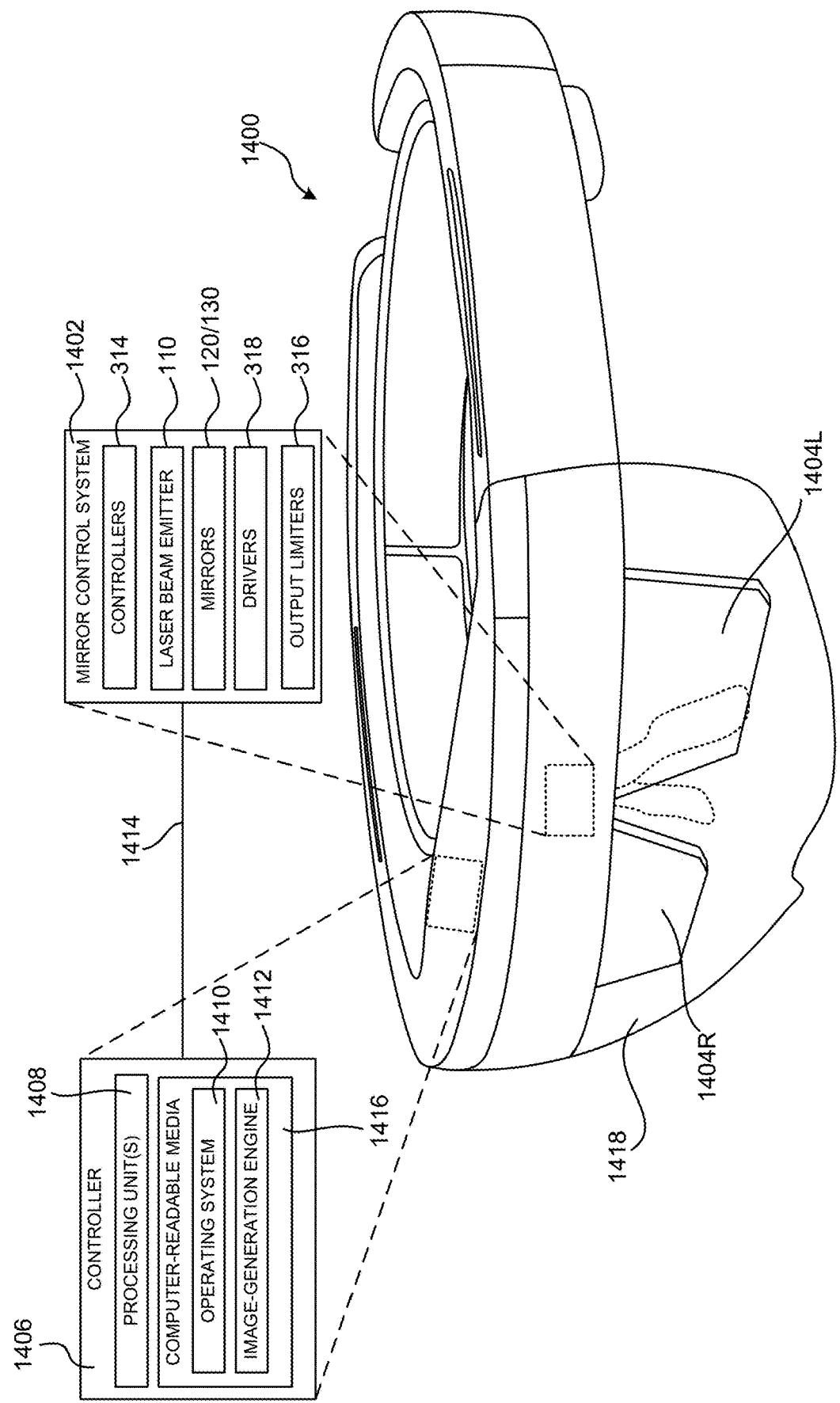
FIG. 14 shows the display device in the form of a head-mounted display device.

FIG. 14 shows the display device in the form of a head-mounted display device. The head-mounted display may be a near-eye display ("NED") device 1400 that includes a mirror control system 1402 implementing aspects of the technologies disclosed herein. The mirror control system 1402 includes the laser beam emitter 110, mirrors 120 and 130, and controllers 1406. Similar components were described in detail above with regard to FIGS. 1-14.

In some examples, the NED device 1400 may utilize the mirror control system 1402 to generate a composite view (e.g., from a perspective of a user that is wearing the NED device 1400) that includes both one or more computer-generated ("CG") images and a view of at least a portion of a real-world environment surrounding the NED device 1400. For example, the mirror control system 1402 may utilize various technologies such as, for example, augmented reality ("AR") technologies to generate composite views that include CG images superimposed over a real-world view. As such, the mirror control system 1402 may be configured to generate CG images via a display panel 1404.

In the illustrated example, the display panel 1404 includes separate right eye and left eye transparent display panels, labeled 1404R and 1404L, respectively. In some examples, the display panel 1404 may include a single transparent display panel that is viewable with both eyes and/or a single transparent display panel that is viewable by a single eye only.

It can be appreciated that the techniques described herein may be deployed within a single-eye NED device 1400 (e.g. GOOGLE GLASS) and/or a dual-eye NED device 1400 (e.g. MICROSOFT HOLOLENS). The NED device 1400 shown in FIG. 14 is an example device that is used to provide context and illustrate various features and aspects of the mirror control system 1402 disclosed herein. Other devices and systems may also use the mirror control system 1402 disclosed herein.

In some examples, the display panel 1404 may be a waveguide display that includes one or more diffractive optical elements ("DOEs") for in-coupling incident light into a waveguide, expanding the incident light in one or more directions for exit pupil expansion, and/or out-coupling the incident light out of the waveguide (e.g., toward a user's eye). In some examples, the NED device 1400 may further include an additional see-through optical component in the form of a transparent veil 1418 positioned between the real-world environment (which real-world environment makes up no part of the claimed invention) and the display panel 1404.

It can be appreciated that the transparent veil 1418 may be included in the NED device 1400 for purely aesthetic and/or protective purposes. The NED device 1400 may further include various other components, for example speakers, microphones, accelerometers, gyroscopes, magnetometers, temperature sensors, touch sensors, inertial measurement sensors, biometric sensors, other image sensors, energy-storage components (e.g. battery), a communication facility, a global positioning system ("GPS") receiver, etc.

In the illustrated example, a controller 1406 is operatively coupled to the mirror control system 1402. The controller 1406 includes one or more logic devices and one or more computer memory devices storing instructions executable by the logic device(s) to deploy aspects of the functionality described herein with relation to the mirror control system 1402. The controller 1406 and the mirror control system 1402 of the NED device 1400 are operatively connected, for example, via a bus 1414, which can include one or more of a system bus, a data bus, an address bus, a PCI bus, a Mini-PCI bus, and any variety of local, peripheral, and/or independent buses.

The controller 1406 can also include one or more processing units 1408. The processing unit(s) 1408, can represent, for example, a CPU-type processing unit, a GPU-type processing unit, a field-programmable gate array ("FPGA"), a digital signal processor ("DSP"), or other hardware logic components that may, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

The controller 1406 can also include one or more computer-readable media 1416 storing an operating system 1410 and data such as, for example, image data that defines one or more CG images for presentation by the NED device 1400. The computer-readable media 1416 may further include an image-generation engine 1412 that generates output signals to control aspects of the operation of the mirror control system 1402 to present the CG images.

As used herein, computer-readable media, such as computer-readable media 1416, can store instructions executable by the processing units 1408. The computer-readable media 1416 can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in the NED device 1400, while in some examples one or more of a CPU, GPU, and/or accelerator are external to the NED device 1400.

As used herein, the term computer-readable media can include computer storage media and/or communication media. Computer storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data.

Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device in a non-transitory fashion.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Figure 15:
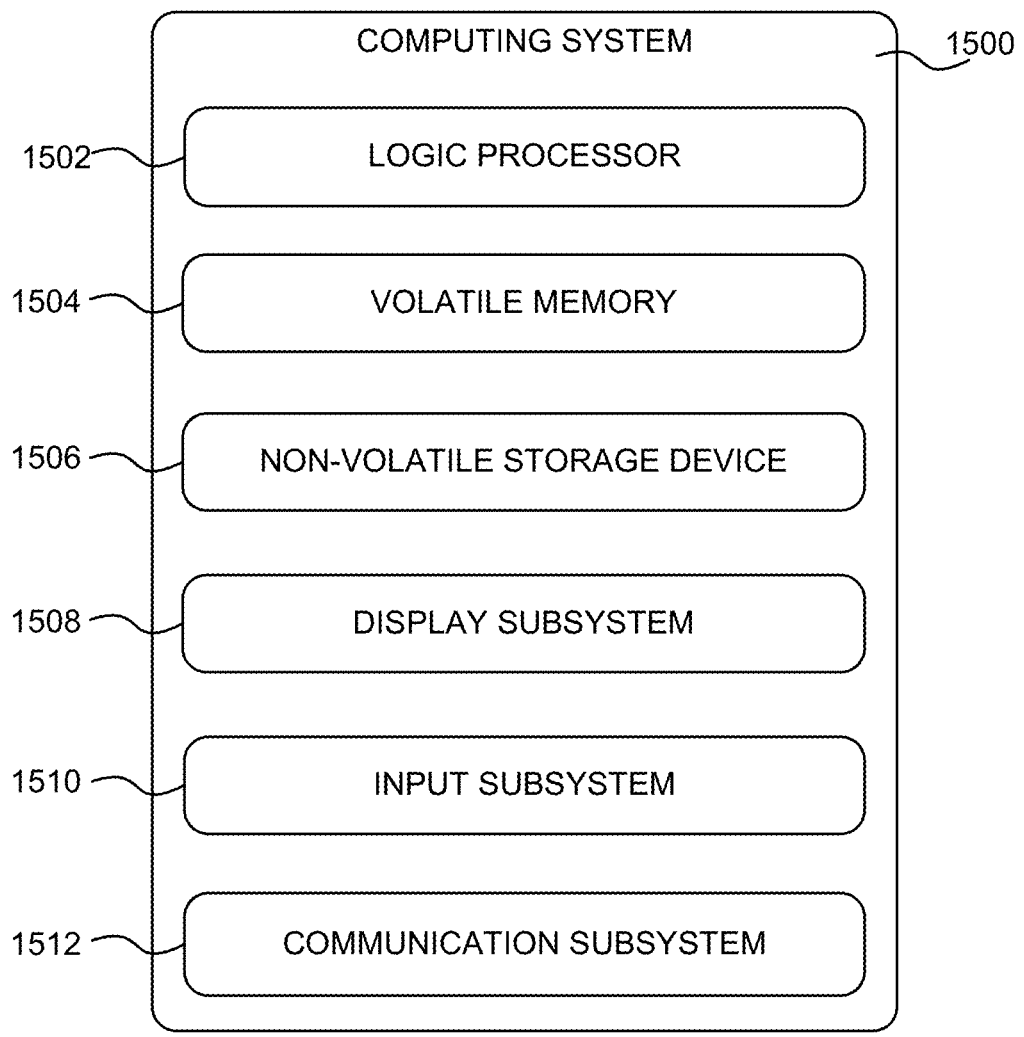
FIG. 15 shows an example computing environment in which the computer device may be enacted.

FIG. 15 shows an example computing environment in which aspects of the technologies disclosed herein can be implemented. In particular, FIG. 15 schematically shows a non-limiting embodiment of a computing system 1500 that can be used to implement the technologies disclosed herein. Computing system 1600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1600 includes a logic processor 1502 volatile memory 1504, and a non-volatile storage device 1506. Computing system 1600 may optionally include a display subsystem 1508, input subsystem 1510, communication subsystem 1512, and/or other components not shown in FIG. 15.

Logic processor 1502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1502 may include one or more physical processors (e.g., hardware) configured to execute software instructions. Additionally, or alternatively, the logic processor 1502 may include one or more hardware logic circuits or firmware devices configured to execute hardware-implemented logic or firmware instructions.

The logic processor 1502 may be single-core or multi-core, and the instructions executed thereon may be configured for sequential, parallel, and/or distributed processing. Individual components of the logic processor 1502 optionally may be distributed among two or more separate devices, which may be remotely located and/or configured for coordinated processing. Aspects of the operation of the logic processor 1502 may be virtualized and executed by remotely accessible, networked computing devices configured in a cloud-computing configuration. In such a case, these virtualized aspects are run on different physical logic processors of various different machines, it will be understood.

Non-volatile storage device 1506 includes one or more physical devices configured to hold instructions executable by the logic processors to implement aspects of the methods and processes described herein. When such methods and processes are implemented, the state of non-volatile storage device 1506 may be transformed—e.g., to hold different data.

Non-volatile storage device 1506 may include physical devices that are removable and/or built-in. Non-volatile storage device 1506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1506 may include nonvolatile, dynamic, static, read/write, read-only, sequential-access, location-addressable, file-addressable, and/or content-addressable devices. It will be appreciated that non-volatile storage device 1506 is configured to hold instructions even when power is cut to the non-volatile storage device 1506.

Volatile memory 1504 may include physical devices that include random access memory. Volatile memory 1504 is typically utilized by logic processor 1502 to temporarily store information during processing of software instructions. It will be appreciated that volatile memory 1504 typically does not continue to store instructions when power is removed from the volatile memory 1504. Aspects of logic processor 1502, volatile memory 1504, and non-volatile storage device 1506 may be integrated together into one or more hardware-logic components, such as within an ASIC, SOC, or FPGA.

The terms "module," "program," and "engine" may be used to describe an aspect of computing system 1500 typically implemented in software by a processor 1502 to perform a particular function using portions of volatile memory 1504, which function involves transformative processing that specially configures the processor 1502 to perform the function. Thus, a module, program, or engine may be instantiated via logic processor 1602 executing instructions held by non-volatile storage device 1506, using portions of volatile memory 1504.

It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1508 may be used to present a visual representation of data held by non-volatile storage device 1506. The visual representation may take the form of a graphical user interface ("GUI"). As the herein described methods and processes change the data held by the non-volatile storage device, and thus transform the state of the non-volatile storage device, the state of display subsystem 1508 may likewise be transformed to visually represent changes in the underlying data. Display subsystem 1508 may include one or more display devices utilizing virtually any type of technology, such as the LBS display devices disclosed herein. Such display devices may be combined with logic processor 1502, volatile memory 1504, and/or non-volatile storage device 1506 in a shared enclosure, or such display devices may be peripheral display devices.

When included, input subsystem 1510 may comprise or interface with one or more user-input devices such as a keyboard, mouse, touch screen, or game controller. In some embodiments, the input subsystem may comprise or interface with selected natural user input ("NUI") componentry. Such componentry may be integrated or peripheral, and the transduction and/or processing of input actions may be handled on- or off-board.

Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1512 may be configured to communicatively couple various computing devices described herein with each other, and with other devices. Communication subsystem 1512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The disclosure presented herein also encompasses the subject matter set forth in the following clauses:

Example Clause 1: A display device to display an image in a display region, the display device comprising: a laser beam emitter configured to emit a laser beam; a slow-scan mirror (120) that is responsive to a slow-scan drive signal (172) to direct the laser beam (112) onto the display region (140) and generate the image (142), wherein the slow-scan mirror (120) generates a slow-scan feedback signal (122); a slow-scan driver (170) configured to generate the slow-scan drive signal (172); and a slow-scan controller (150) configured to adjust the slow-scan drive signal (172) for the slow-scan mirror (120) with the slow-scan driver (170), wherein the slow-scan controller (150) comprises: an outer control loop with an open angle control (203) for the slow-scan mirror (120); an inner control loop (210) with: a notch filter (213); a summer (212); and an adaptive notch compensator (216); wherein the outer control loop of the slow-scan controller (15) are responsive to the slow-scan feedback signal (122); and wherein the adaptive notch compensator (216) of the inner control loop (230) of the slow-scan controller is configured to receive the slow-scan feedback signal (122), actively detects ripple in the slow-scan mirror trajectory, and dynamically adjust a feedback waveform that is combined with the slow-scan drive signal (172) by the summer (212) to compensate for the detected ripple.

Example Clause 2: The display device of clause 1, wherein the adaptive notch compensator includes a VPZR sensor, a ripple detector, and a signal correction generator, wherein the VPZR sensor is configured to receive the slow-scan feedback signal and generate a sense signal responsive to the slow-scan feedback signal, the ripple detector is configured to receive the sense signal and generate an error signal responsive to the sense signal, and the signal correction generator is configured to receive the error signal and generate the feedback waveform responsive to the error signal.

Example Clause 3: The display device of clauses 1 and 2, wherein the adaptive notch compensator includes one or more time-domain based filters that are configured to detect the ripple in the slow-scan mirror trajectory and adjust the feedback waveform.

Example Clause 4: The display device of clauses 1 through 3, wherein the adaptive notch compensator includes a first time-domain based filter $H_1(s)$ that receives the slow-scan feedback signal and generates a first filter output, and a second time-domain based filter $H_2(s)$ that receives the first filter output and generates a second filter output, wherein the second filter output is coupled to the summer such that the feedback waveform is adjusted in response to the second filter output.

Example Clause 5: The display device of clauses 1 through 4, wherein the first and second time-domain based filters have a transfer function defined as $H_1(s)*H_2(s)$, where:

$H_1(s)=(1+as)/(1+bs)$;

$H_2(s)=c/(1+ds)$; and wherein a, b, c and d correspond to filter coefficients that are constants.

Example Clause 6: The display device of clauses 1 through 5, wherein the adaptive notch compensator includes a first time-domain based filter $H_1(s)$ that receives the slow-scan feedback signal and generates a first filter output, and a second time-domain based filter $H_2(s)$ that receives the first filter output and generates a second filter output, and a gain block that receives the second filter output and generates a feedback signal, wherein the feedback signal is coupled to the summer such that the feedback waveform is adjusted in response to the second filter output.

Example Clause 7: The display device of clauses 1 through 6, wherein the adaptive notch compensator includes either a frequency-domain based ripple detector, or a time-domain based rippled detector.

Example Clause 8: The display device of clauses 1 through 7 wherein the adaptive notch compensator includes a signal processor, wherein the signal processor is configured to capture a frame of VPZR measurements from the slow scan feedback signal, compare a spectral fingerprint associated with the VPZR measurements to a spectral fingerprint of an ideal ramp to generate a spectral difference signal, wherein the feedback waveform is adjusted responsive to the spectral difference signal.

Example Clause 9: The display device of clauses 1 through 8, wherein the adaptive notch compensator includes a buffer that is configured to capture the frame of VPZR measurements from the slow scan feedback signal.

Example Clause 10: The display device of clauses 1 through 9, wherein the adaptive notch compensator includes an analog-to-digital converter that is configured to convert the slow scan feedback signal from an analog signal to a digital signal, wherein the signal processor is configured to evaluate the digital signal to capture the frame of VPZR measurements.

Example Clause 11: The display device of clauses 1 through 10, wherein the adaptive notch compensator includes a gain block and an analog-to-digital converter, wherein the gain block includes an input configured to receive the slow scan feedback signal, the analog-to-digital-converter includes an input that is configured to receive the output of the gain block, and the analog-to-digital converter generates a digital signal, wherein the signal processor is configured to evaluate the digital signal to capture the frame of VPZR measurements.

Example Clause 12: The display device of clauses 1 through 11, wherein the adaptive notch compensator includes an analog-to-digital converter and a buffer, wherein the analog to digital converter is configured to convert the slow scan feedback signal from an analog signal to a digital signal, the buffer is configured to capture the frame of VPZR data from the digital signal, and wherein the signal processor is configured to evaluate the captured frame of VPZR measurements from the buffer.

Example Clause 13: The display device of clauses 1 through 12, wherein the adaptive notch compensator includes an FFT block configured to generate the spectral fingerprint associated with the frame of VPZR measurements, and a spectral comparator configured to compare the spectral fingerprint associated with the frame of VPZR measurements with the spectral fingerprint of the ideal ramp.

Example Clause 14: The display device of clauses 1 through 13, wherein the adaptive notch compensator includes a look-up table that is configured to store the spectral fingerprint of the ideal ramp.

Example Clause 15: The display device of clauses 1 through 14, wherein the adaptive notch compensator includes an inverse FFT (IFFT) block that is configured to convert the spectral difference signal from a frequency domain signal to a time-domain based signal, wherein the feedback waveform is adjusted responsive to the time-domain based signal.

Example Clause 16: A method to compensate a slow-scan driver signal of a slow-scan mirror in a laser beam scanning (LBS) device, the method comprising: generating a signal waveform for a slow scan driver signal. coupling the signal waveform to an input of a summer; coupling an output of the summer to a notch filter with a notch frequency; coupling an output of the notch filter to a slow-scan driver that drives the slow-scan mirror with the slow scan driver signal; generating a slow scan feedback signal with the slow-scan mirror device, wherein the slow-scan feedback signal is responsive to a mirror position of the slow-scan mirror device when driven with the slow scan driver signal, wherein the slow-scan feedback signal includes VPZR measurements; evaluating the VPZR measurements from slow-scan feedback signal with an adaptive notch compensator to determine if ripple occurs in the trajectory of the slow-scan mirror; generating a feedback signal waveform with the adaptive notch compensator when ripple is detected; and coupling the feedback signal waveform to another input of the summer such that the signal waveform of the slow-scan driver signal is adjusted.

Example Clause 17: The method of clause 16, wherein evaluating the VPZR measurements from slow-scan feedback signal with the adaptive notch compensator comprises:
applying the slow-scan feedback signal to a first time-domain based filter to generate a first filter signal;
applying the first filter signal to a second time-domain based filter to generate a second filter signal; and
adjusting the waveform of the slow scan drive signal responsive to the second filter signal;

Example Clause 18: The method of clauses 16 and 17, wherein evaluating the VPZR measurements from slow-scan feedback signal with the adaptive notch compensator comprises: applying the slow-scan feedback signal to a first time-domain based filter to generate a first filter signal; applying the first filter signal to a second time-domain based filter to generate a second filter signal; gain scaling the second filter signal to generate a first output signal; gain scaling the slow-scan feedback signal to generate a second output signal; combining, with the summer, the first output signal, the second output signal, and the waveform of the slow-scan drive signal such that the waveform of the slow scan drive signal is adjusted.

Example Clause 19: The method of clauses 16 through 18, wherein evaluating the VPZR measurements from slow-scan feedback signal with the adaptive notch compensator comprises: capturing a frame of VPZR measurements from the slow-scan mirror; converting the frame of VPZR measurements into a VPZR spectral fingerprint with an FFT; comparing the VPZR spectral fingerprint to a spectral fingerprint of an ideal ramp to generate a spectral difference; computing an inverse FFT of the spectral difference to generate a feedback signal; combining, with the summer, the feedback signal and the waveform of the slow-scan drive signal such that the waveform of the slow scan drive signal is adjusted responsive to the spectral difference.

Example Clause 20: A display device system to display an image in a display region, the system comprising: a MEMS based slow-scan mirror (120) responsive to a slow-scan drive signal (172) to adjust a beam deflection angle effective to draw a frame of the image in the display region responsive to the slow-scan drive signal, wherein the slow-scan mirror (120) generates a slow-scan feedback signal (122) based on the beam deflection angle; a slow-scan driver (170) configured to generate the slow-scan drive signal (172); and a slow-scan controller (150) configured to adjust the slow-scan drive signal (172) for the slow-scan mirror (120) with the slow-scan driver (170), wherein the slow-scan controller (150) comprises: an outer control loop with an open angle control (203) for the slow-scan mirror (120); an inner control loop (210) with:
a notch filter (213);
a summer (212); and
an adaptive notch compensator (216);
wherein the outer control loop and the inner control loop of the slow-scan controller (15) are responsive to the slow-scan feedback signal (122); and
wherein the adaptive notch compensator (216) of the inner control loop (230) of the slow-scan controller is configured to receive the slow-scan feedback signal (122), actively detects ripple in the slow-scan mirror trajectory based on the slow-scan feedback signal, and dynamically adjust a feedback waveform that is combined with the slow-scan drive signal (172) by the summer (212) to compensate for the detected ripple.

The subject matter of the present disclosure includes all novel and non-obvious combinations and sub-combinations of the various processes, systems and configurations, and other features, functions, acts, and/or properties disclosed herein, as well as any and all equivalents thereof.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. It is also understood that a "loop" or a "control loop" refers to any process, module, chipset, or any hardware or software component performing a set of operations that execute periodically. The period in which the set of operations repeat is based on a physical clock speed and/or any mechanism that controls a delay between each execution.

The subject matter of the present disclosure includes all novel and non-obvious combinations and sub-combinations of the various processes, systems and configurations, and other features, functions, acts, and/or properties disclosed herein, as well as any and all equivalents thereof.

We claim:

1. A display device to display an image in a display region, the display device comprising:
a laser beam emitter configured to emit a laser beam;
a slow-scan mirror that is responsive to a slow-scan drive signal to direct the laser beam onto the display region and generate the image, wherein the slow-scan mirror generates a slow-scan feedback signal;
a slow-scan driver configured to generate the slow-scan drive signal; and
a slow-scan controller configured to adjust the slow-scan drive signal for the slow-scan mirror with the slow-scan driver, wherein the slow-scan controller comprises:

an outer control loop with an open angle control for the slow-scan mirror;
an inner control loop with:
a notch filter;
a summer; and
an adaptive notch compensator;
wherein the outer control loop and the inner control loop of the slow-scan controller (15) are responsive to the slow-scan feedback signal; and
wherein the adaptive notch compensator of the inner control loop of the slow-scan controller is configured to receive the slow-scan feedback signal, actively detects ripple in the slow-scan mirror trajectory, and dynamically adjust a feedback waveform that is combined with the slow-scan drive signal by the summer to compensate for the detected ripple.

2. The display device of claim 1, wherein the adaptive notch compensator includes a VPZR sensor, a ripple detector, and a signal correction generator, wherein the VPZR sensor is configured to receive the slow-scan feedback signal and generate a sense signal responsive to the slow-scan feedback signal, the ripple detector is configured to receive the sense signal and generate an error signal responsive to the sense signal, and the signal correction generator is configured to receive the error signal and generate the feedback waveform responsive to the error signal.

3. The display device of claim 1, wherein the adaptive notch compensator includes one or more time-domain based filters that are configured to detect the ripple in the slow-scan mirror trajectory and adjust the feedback waveform.

4. The display device of claim 1, wherein the adaptive notch compensator includes a first time-domain based filter $H_1(s)$ that receives the slow-scan feedback signal and generates a first filter output, and a second time-domain based filter $H_2(s)$ that receives the first filter output and generates a second filter output, wherein the second filter output is coupled to the summer such that the feedback waveform is adjusted in response to the second filter output.

5. The display device of claim 4, wherein the first and second time-domain based filters have a transfer function defined as $H_1(s)*H_2(s)$, where:

$$H_1(s)=(1+as)/(1+bs);$$

$$H_2(s)=c/(1+ds);\text{ and}$$

wherein a, b, c and d correspond to filter coefficients that are constants.

6. The display device of claim 1, wherein the adaptive notch compensator includes a first time-domain based filter $H_1(s)$ that receives the slow-scan feedback signal and generates a first filter output, and a second time-domain based filter $H_2(s)$ that receives the first filter output and generates a second filter output, and a gain block that receives the second filter output and generates a feedback signal, wherein the feedback signal is coupled to the summer such that the feedback waveform is adjusted in response to the second filter output.

7. The display device of claim 1, wherein the adaptive notch compensator includes either a frequency-domain based ripple detector, or a time-domain based rippled detector.

8. The display device of claim 1 wherein the adaptive notch compensator includes a signal processor, wherein the signal processor is configured to capture a frame of VPZR measurements from the slow scan feedback signal, compare a spectral fingerprint associated with the VPZR measurements to a spectral fingerprint of an ideal ramp to generate a spectral difference signal, wherein the feedback waveform is adjusted responsive to the spectral difference signal.

9. The display device of claim 8, wherein the adaptive notch compensator includes a buffer that is configured to capture the frame of VPZR measurements from the slow scan feedback signal.

10. The display device of claim 8, wherein the adaptive notch compensator includes an analog-to-digital converter that is configured to convert the slow scan feedback signal from an analog signal to a digital signal, wherein the signal processor is configured to evaluate the digital signal to capture the frame of VPZR measurements.

11. The display device of claim 8, wherein the adaptive notch compensator includes a gain block and an analog-to-digital converter, wherein the gain block includes an input configured to receive the slow scan feedback signal, the analog-to-digital-converter includes an input that is configured to receive the output of the gain block, and the analog-to-digital converter generates a digital signal, wherein the signal processor is configured to evaluate the digital signal to capture the frame of VPZR measurements.

12. The display device of claim 8, wherein the adaptive notch compensator includes an analog-to-digital converter and a buffer, wherein the analog to digital converter is configured to convert the slow scan feedback signal from an analog signal to a digital signal, the buffer is configured to capture the frame of VPZR data from the digital signal, and wherein the signal processor is configured to evaluate the captured frame of VPZR measurements from the buffer.

13. The display device of claim 8, wherein the adaptive notch compensator includes an FFT block configured to generate the spectral fingerprint associated with the frame of VPZR measurements, and a spectral comparator configured to compare the spectral fingerprint associated with the frame of VPZR measurements with the spectral fingerprint of the ideal ramp.

14. The display device of claim 8, wherein the adaptive notch compensator includes a look-up table that is configured to store the spectral fingerprint of the ideal ramp.

15. The display device of claim 8, wherein the adaptive notch compensator includes an inverse FFT (IFFT) block that is configured to convert the spectral difference signal from a frequency domain signal to a time-domain based signal, wherein the feedback waveform is adjusted responsive to the time-domain based signal.

16. A method to compensate a slow-scan driver signal of a slow-scan mirror in a laser beam scanning (LBS) device, the method comprising:
generating a signal waveform for a slow scan driver signal;
coupling the signal waveform to an input of a summer;
coupling an output of the summer to a notch filter with a notch frequency;
coupling an output of the notch filter to a slow-scan driver that drives the slow-scan mirror with the slow scan driver signal;
generating a slow scan feedback signal with the slow-scan mirror device, wherein the slow-scan feedback signal is responsive to a mirror position of the slow-scan mirror device when driven with the slow scan driver signal, wherein the slow-scan feedback signal includes VPZR measurements;
evaluating the VPZR measurements from slow-scan feedback signal with an adaptive notch compensator to determine if ripple occurs in the trajectory of the slow-scan mirror;

generating a feedback signal waveform with the adaptive notch compensator when ripple is detected; and coupling the feedback signal waveform to another input of the summer such that the signal waveform of the slow-scan driver signal is adjusted.

17. The method of claim 16, wherein evaluating the VPZR measurements from slow-scan feedback signal with the adaptive notch compensator comprises:

applying the slow-scan feedback signal to a first time-domain based filter to generate a first filter signal;

applying the first filter signal to a second time-domain based filter to generate a second filter signal; and adjusting the waveform of the slow scan drive signal responsive to the second filter signal.

18. The method of claim 16, wherein evaluating the VPZR measurements from slow-scan feedback signal with the adaptive notch compensator comprises:

applying the slow-scan feedback signal to a first time-domain based filter to generate a first filter signal;

applying the first filter signal to a second time-domain based filter to generate a second filter signal;

gain scaling the second filter signal to generate a first output signal;

gain scaling the slow-scan feedback signal to generate a second output signal;

combining, with the summer, the first output signal, the second output signal, and the waveform of the slow-scan drive signal such that the waveform of the slow scan drive signal is adjusted.

19. The method of claim 16, wherein evaluating the VPZR measurements from slow-scan feedback signal with the adaptive notch compensator comprises:

capturing a frame of VPZR measurements from the slow-scan mirror;

converting the frame of VPZR measurements into a VPZR spectral fingerprint with an FFT;

comparing the VPZR spectral fingerprint to a spectral fingerprint of an ideal ramp to generate a spectral difference;

computing an inverse FFT of the spectral difference to generate a feedback signal;

combining, with the summer, the feedback signal and the waveform of the slow-scan drive signal such that the waveform of the slow scan drive signal is adjusted responsive to the spectral difference.

20. A display device system to display an image in a display region, the system comprising:

a MEMS based slow-scan mirror responsive to a slow-scan drive signal to adjust a beam deflection angle effective to draw a frame of the image in the display region responsive to the slow-scan drive signal, wherein the slow-scan mirror generates a slow-scan feedback signal based on the beam deflection angle;

a slow-scan driver configured to generate the slow-scan drive signal; and a slow-scan controller configured to adjust the slow-scan drive signal for the slow-scan mirror with the slow-scan driver, wherein the slow-scan controller comprises:

an outer control loop with an open angle control for the slow-scan mirror;

an inner control loop with:
a notch filter;
a summer; and
an adaptive notch compensator;

wherein the outer control loop and the inner control loop of the slow-scan controller (15) are responsive to the slow-scan feedback signal; and wherein the adaptive notch compensator of the inner control loop of the slow-scan controller is configured to receive the slow-scan feedback signal, actively detects ripple in the slow-scan mirror trajectory based on the slow-scan feedback signal, and dynamically adjust a feedback waveform that is combined with the slow-scan drive signal by the summer to compensate for the detected ripple.

* * * * *